US009047678B2

(12) United States Patent
O'Hara et al.

(10) Patent No.: US 9,047,678 B2
(45) Date of Patent: Jun. 2, 2015

(54) CHANGE ANALYST

(75) Inventors: Charles G. O'Hara, Columbus, MS (US); Anil Cheriyadat, Knoxville, TN (US); Suyoung Seo, Starkville, MS (US); Veeraraghavan Vijayaraj, Knoxville, TN (US)

(73) Assignee: Mississippi State University Research and Technology Corporation MS (US)

( * ) Notice: Subject to any disclaimer, the term of this patent is extended or adjusted under 35 U.S.C. 154(b) by 338 days.

(21) Appl. No.: 13/506,384

(22) Filed: Apr. 16, 2012

(65) Prior Publication Data

US 2012/0275699 A1 Nov. 1, 2012

Related U.S. Application Data

(62) Division of application No. 11/279,841, filed on Apr. 14, 2006, now Pat. No. 8,160,296.

(60) Provisional application No. 60/671,516, filed on Apr. 15, 2005.

(51) Int. Cl.
*G06K 9/00* (2006.01)
*G06K 9/38* (2006.01)
*G06T 7/20* (2006.01)
*G06T 7/00* (2006.01)

(52) U.S. Cl.
CPC .............. *G06T 7/2053* (2013.01); *G06T 7/0081* (2013.01); *G06T 7/0097* (2013.01); *G06T 2207/10032* (2013.01); *G06T 2207/20224* (2013.01); *G06T 2207/30181* (2013.01); *G06K 9/0063* (2013.01)

(58) Field of Classification Search
USPC ................. 382/103, 168, 169, 170, 171, 172; 348/154, 155
See application file for complete search history.

(56) References Cited

U.S. PATENT DOCUMENTS

2006/0109902 A1* 5/2006 Yu et al. ................... 375/240.12

* cited by examiner

*Primary Examiner* — John Strege
(74) *Attorney, Agent, or Firm* — Lawrence Arthur Schemmel

(57) ABSTRACT

A method of determining change in a state of an object using images of the object, the method including providing a first image and a second image of the object, the first image and the second image being spaced apart in time, performing a plurality of pixel-based change detection algorithms to obtain a plurality of output difference products/images containing change information and pseudo change information, combining the plurality of output difference products to form a hybrid output difference product, and thresholding the output difference product to detect changes in the object.

13 Claims, 23 Drawing Sheets

CHANGE ANALYST

CROSS-REFERENCE TO RELATED APPLICATIONS

This application is a divisional application of U.S. patent application Ser. No. 11/279,841, filed Apr. 14, 2006 now U.S. Pat. No. 8,160,296, which claims priority to provisional application Ser. No. 60/671,516, filed on Apr. 15, 2005, the entire contents of which are incorporated herein by reference.

STATEMENT AS TO RIGHTS TO INVENTIONS MADE UNDER FEDERALLY SPONSORED RESEARCH AND DEVELOPMENT

This invention was made with Government support under SBAHQ-03-1-0023 awarded by the U.S. Small Business Administration. The government may have certain rights in the invention.

FIELD OF THE INVENTION

The present invention relates generally to image sensing and image treatment methods systems and more particularly to analysis and detection of change in images.

BRIEF SUMMARY OF THE INVENTION

An aspect of the present invention is to provide a method of determining change in a state of an object using images of the object. The method includes providing a first image and a second image of the object, the first image and the second image being spaced apart in time, performing a plurality of pixel-based change detection algorithms to obtain a plurality of output difference images (or products) containing change information and pseudo change information, and combining the plurality of output difference products to form a hybrid difference product that can be thresholded to detect changes. The output difference products are preferably combined using a weighted voting scheme, wherein the weights for each product may be different or the same. In some embodiments, region-based filtering is performed on the hybrid difference product to further remove pseudo change information.

Another aspect of the present invention is to provide a method of estimating threshold values for change detection. The method includes computing a probability distribution function of pixel intensity values in a difference image and plotting the probability distribution function as a histogram. The method further includes generating a modified histogram of pixel intensity values by taking into account contextual spatial information of pixel intensity values, and selecting a threshold value by observing the modified histogram for separating change areas from no change areas in the difference image.

Yet another aspect of the present invention is to provide a method of estimating threshold values for change detection, the method including computing a probability distribution function of pixel intensity values in a difference image, plotting the probability distribution function as a histogram, generating a co-occurrence matrix or a gray level versus local gray level matrix of pixel intensity values corresponding to the histogram by taking into account contextual spatial information of pixel intensity values, calculating a busyness measure for the co-occurrence matrix or the gray level versus local gray level matrix by making a double summation of all elements of the matrix, and determining a threshold value by locating where a slope of the busyness measure changes.

DESCRIPTION OF EMBODIMENTS OF THE INVENTION

Change detection can play a role in monitoring changes that occurred due to anthropogenic activities or natural activities such as natural calamities or the like. Change detection can be defined as the process of identifying differences in the state of an object or phenomenon by observing, measuring, and quantifying images obtained for the object (e.g., at a location) at different times. Usually change detection strategy involves analysis of co-registered images in spectral form or transformed form. The analysis involves calculating the magnitude of change between the pixels in the two images. The pixels are then assigned into two classes, namely change and no-change class, based on the magnitude of their change. If the magnitude of change is equal to or above a pre-defined threshold, the pixel is assigned to change class, and if the magnitude of change is below a pre-defined threshold, the pixel is assigned to no-change class.

However, the differences between images obtained at different times may include "changes per se" and "pseudo changes." Pseudo changes are caused by temporal differences in factors such as sensor, illumination variation due to a change of the sun angle, reflectance variations due to changes in atmospheric conditions, soil moisture level, vegetation phenology, co-registration errors, etc.

Figure 1:
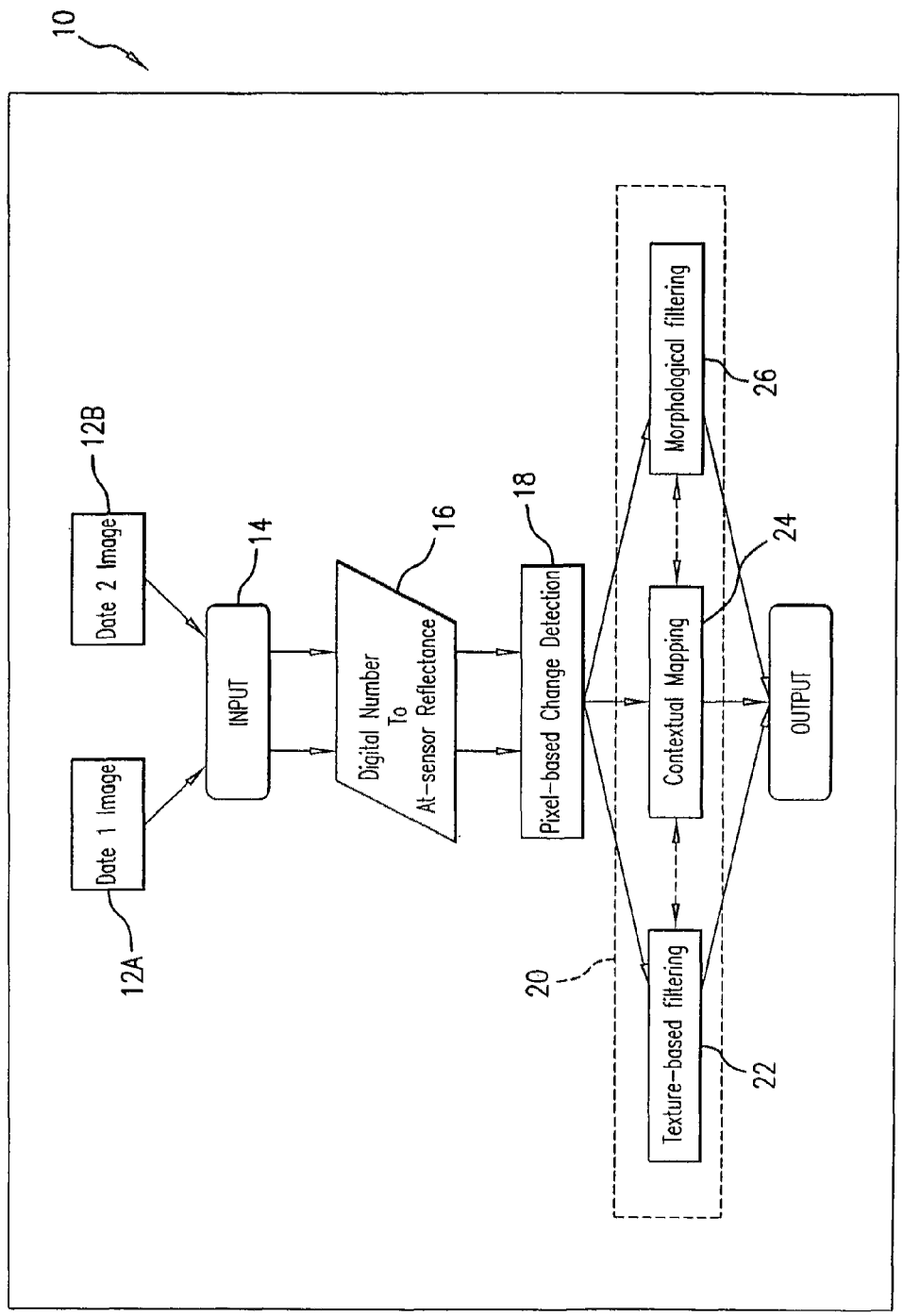
FIG. 1 depicts a block diagram of a change analyst, according to an embodiment of the invention.
Figure 2:
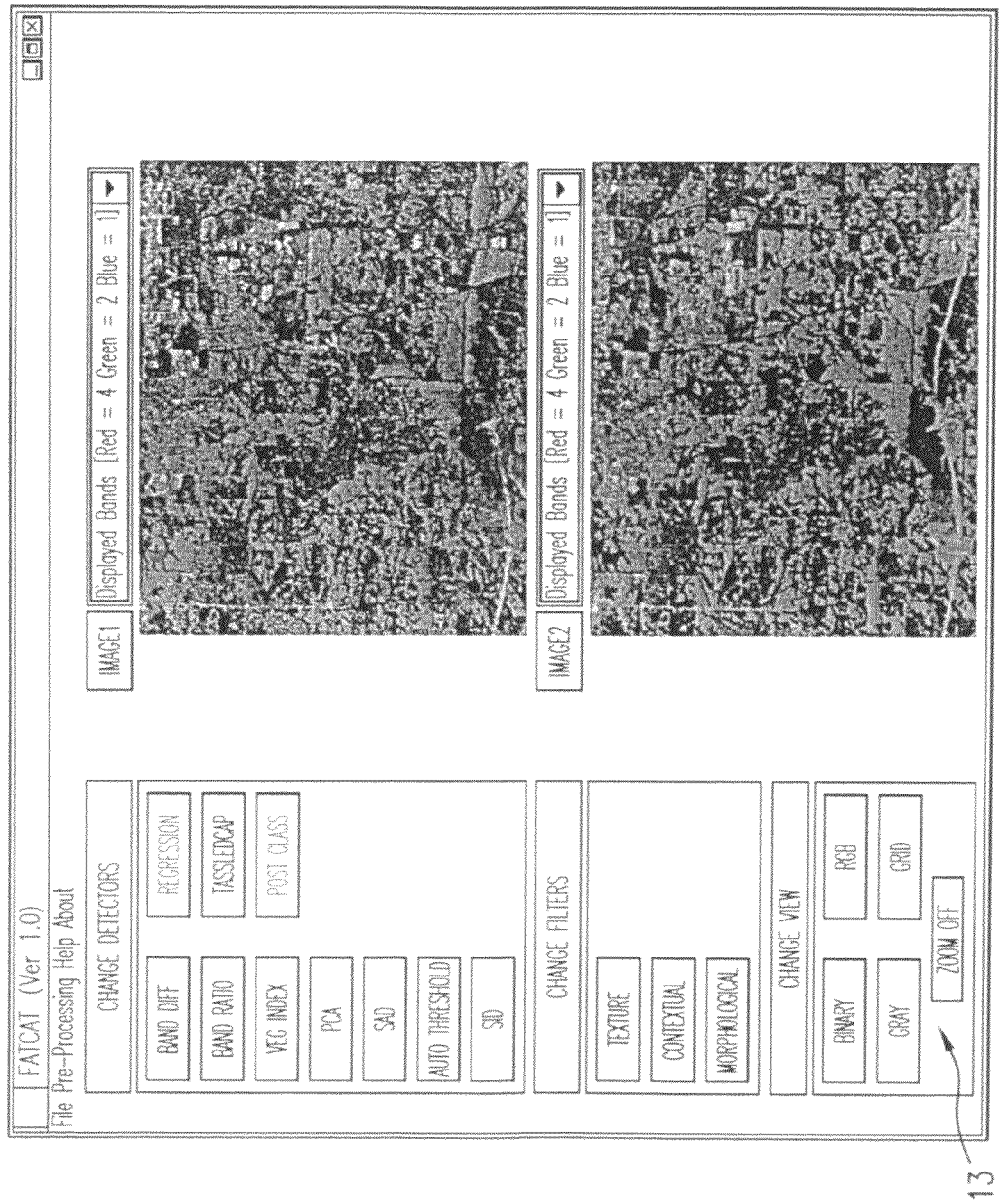
FIG. 2 shows examples of two images loaded into the change analyst, according to an embodiment of the invention.

FIG. 1 depicts a block diagram of a change analyst (CA) 10, according to an embodiment of the invention. The change analyst 10 can be implemented as software that can be run in a computer or as a standalone hardware device (for example, using an application specific integrated circuit or ASIC). In the change analyst 10, at least two images 12A and 12B can be loaded. For example, image 12A is initially loaded at date 1 and image 12B is loaded at a later time or at date 2 into input 14 of the change analyst 10. FIG. 2 shows examples of two images 12A and 12B loaded into the change analyst 10. The two images 12A and 12B are displayed using a graphical user interface (GUI) 13. The change analyst 10 allows a user to load a plurality of images. The images can have the same format or different formats. Examples of formats that can be used for images include, but are not limited to, tiff, geotiff, jpeg, and bmp. The change analyst 10 can also load multi-spectral images as well as panchromatic images. For multi-spectral images, initially a first band is displayed on a screen. By clicking or activating appropriate buttons corresponding to images 12A and 12B in a graphical user interface (GUI) 13 of the change analyst 10, a user can load any particular spectral band or interactively assign any combination of spectral bands to RGB (red, green, and blue) display channels.

In the change analyst 10, prior to performing a change detection algorithm, a pre-processing sub-routine 16 can be optionally run to reduce the impact of variations in illumination. Changes in illumination geometry of the bi-temporal images 12A and 12B may cause identical objects (for example, objects on the ground) to have different reflectance values. Change detection algorithms may pick up these undesired changes due to variations in illumination along with the desired changes in the object. Hence, this may lead to a higher false alarm rate. Therefore, in order to reduce the impact of variations in illumination geometry, a multi-temporal image normalization is performed in the pre-processing sub-routine 16. Converting digital number (DN) values to at-sensor reflectance values may reduce the impact of changes in illumination geometry upon image change detection. Various digital to at-sensor reflectance conversion methods can be used.

For example, in one embodiment of the invention, the change analyst 10 uses a LANDSAT ETM+ digital number to at-sensor reflectance conversion. The following equations can be used to convert digital numbers to radiance and then radiance to at-sensor reflectance. In an embodiment of the invention, a digital number is converted to radiance using the following equation (1), $$L_\lambda = L_{min} + \left(\frac{L_{max} - L_{min}}{Q_{cal\,max} - Q_{cal\,min}}\right)Q_{cal} - Q_{cal\,min} \qquad (1)$$

where $L_x$ is a spectral radiance, $Q_{cal}$ is a calibrated and quantized scaled radiance in units of digital numbers, $Q_{cal\,max}$ is a maximum quantized calibrated pixel value, $Q_{cal\,min}$ is a minimum quantized calibrated pixel value, $L_{min}$ is a spectral radiance at $Q_{cal}=Q_{cal\,min}$, and $L_{max}$ is the spectral radiance at $Q_{cal}=Q_{cal\,max}$.

The radiance values obtained with the equation (1) can be converted into reflectance using the below equation (2), $$\rho_p = \frac{\pi \cdot L_\lambda \cdot d^2}{ESUN_\lambda \cdot \cos\theta_s} \qquad (2)$$

where $\rho_p$ is at-sensor reflectance, $L_\lambda$ is a spectral radiance in units of (mW cm$^{-2}$ ster$^{-1}$ μm$^{-1}$), d is the earth to sun distance in astronomical units, $ESUN_\lambda$ is a mean of solar exoatmospheric irradiances in units of (mW cm$^{-2}$ μm$^{-1}$), and $\theta_s$ is the solar zenith angle in degrees.

The change analyst 10 also comprises a pixel-based change detection sub-routine 18. In an embodiment of the invention, the pixel-based change detection sub-routine 18 comprises pixel-based change detection algorithms such as band differencing, band ratioing, vegetation index analysis, principal component analysis, auto-thresholding for band differencing, tasseled cap analysis, spectral angle analysis, or spectral information divergence, or a combination of two or more thereof.

Figure 3:
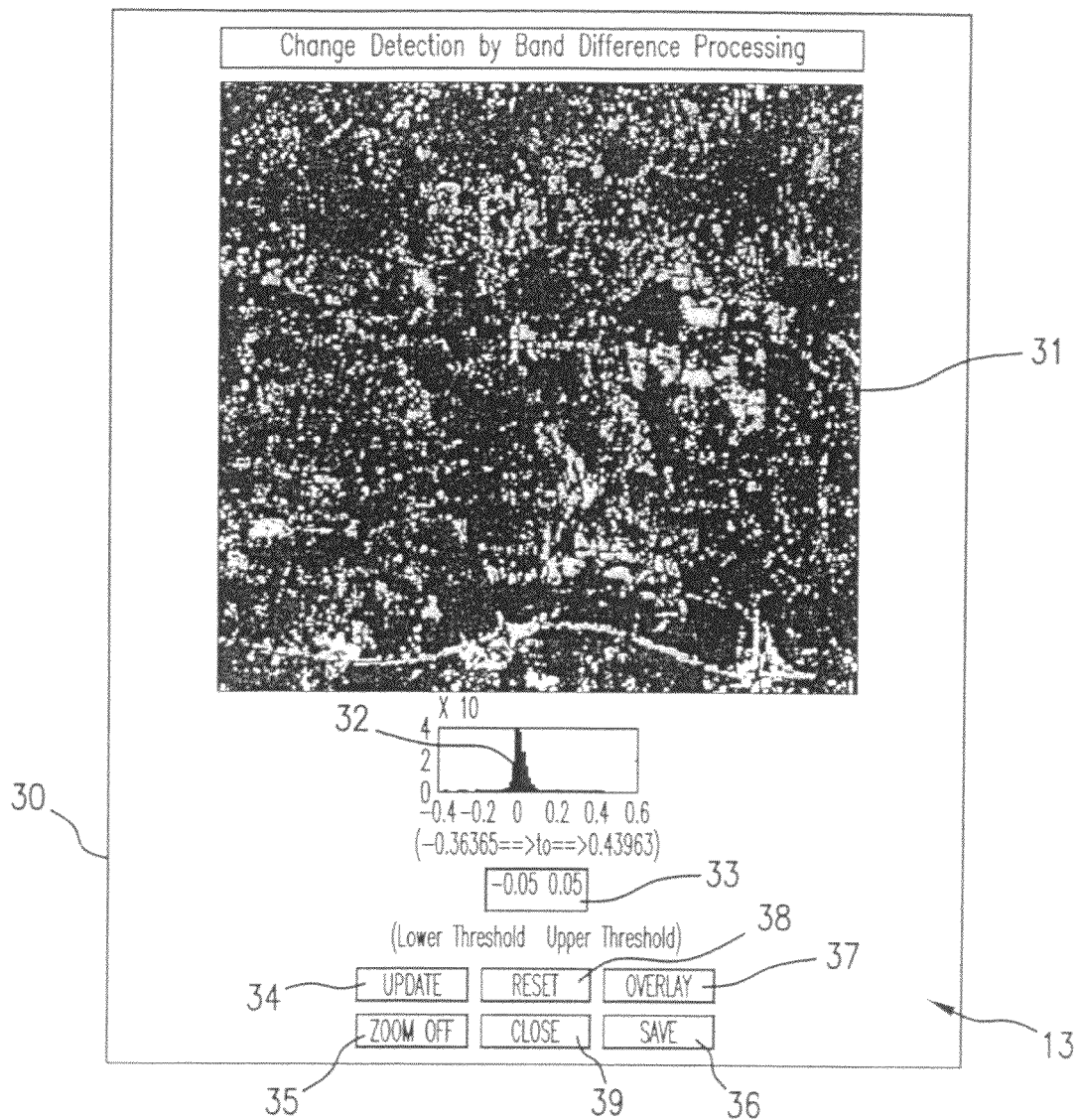
FIG. 3 shows an output binary image obtained using change detection methods used in the change analyst, according to an embodiment of the invention.

An output binary image obtained using these change detection methods can be displayed on a change-view window 30 of change analyst 10 as shown in FIG. 3. The image 31 in the change-view window 30 represents the output binary image with change and no change information. In the following paragraphs, some of pixel-based change detection algorithms listed above are explained in further detail.

In band differencing, bi-temporal images that are geometrically co-registered are subtracted pixel by pixel. The resulting subtracted output can have a Gaussian distribution. In order to distinguish between "change" and "no change" pixels in the Gaussian distributed output, a user may define lower and upper thresholds on the tails of the distribution.

Pixels corresponding to the subtracted output values above and below the upper and lower thresholds respectively are labeled as change pixels. Change analyst 10 allows the user to choose a single band or a multiple (for example, three) band combination for this operation. The user can enter the lower and upper threshold values in a threshold box in the GUI 13 of the change analyst 10, separating them by a comma. This procedure can be followed for all other pixel-based change detection operations where more than one threshold value is entered. The difference in pixel values that fall in-between these threshold values (non-inclusive) are considered as "no change" and the values that fall above and below the upper and lower threshold values, respectively, are considered as "change." The output binary linage which represents the "change" and "no change" information is displayed on the change-view window 30 of the GUI interface 13 of the change analyst 10.

For a single band change detection process, white pixels represent change and black pixels represent no change. For a three-band change detection operation, colored pixels except black represent change and black pixels represent no change. The change view window can also display a histogram 32 for the pixel difference computed. The user can determine appropriate threshold values from the histogram 32. The user can further refine the change detection process by entering new threshold values in the change view window 30 at window 33. The user can also perform operations such as zoom to a particular location in the image by using button 35 in the GUI 13, update the change view window by using button 34 in the GUI 13, save the image using a save button 36, overlay another image by using button 37, reset the computation by using a reset button 38, and close the window using a close button 39. All the aforementioned processes hold for other pixel-based operations as well.

Image ratioing is based on the principal that, for the ratio between pixel values of two different images that are geometrically corrected, areas with no change will have a ratio value of 1 and areas with change will have a value either greater than or less than 1. The thresholds can be set at two locations (above and below) to separate "change" and "no change" classes. Change analyst 10 allows the user to choose a single band or a three-band combination for this operation. Similar to the band differencing method, the user can also enter the two threshold values, separating them by a comma.

In vegetation index analysis (VIA), the difference in vegetation index values can be used as an indicator for the temporal increase and decrease in vegetation. This can be used as supplementary information in the land infrastructure change detection process to identify areas that show a decrease in vegetation. For certain applications, a decrease in vegetation can be related to urban development or potential urban development. The difference in vegetation index values takes on a Gaussian distribution form with zero mean. The tail of the distribution extending towards the positive axis direction represents a decrease in vegetation. In an embodiment of the invention, the vegetation index calculations supported by the change analyst 10 for the LANDSAT ETM+ data are given by the following equations:

$$\text{Ratio vegetation index} = \frac{\text{Band4}(NIR)}{\text{Band3}(Red)} \quad (3)$$

$$\text{Normalized difference vegetation index} = \quad (4)$$
$$\frac{\text{Band4}(NIR) - \text{Band3}(Red)}{\text{Band4}(NIR) + \text{Band3}(Red)} \, NDVI$$

$$\text{Soil-adjusted vegetation index} = \quad (5)$$
$$\left\{\frac{\text{Band4}(NIR) - \text{Band3}(Red)}{\text{Band4}(NIR) + \text{Band3}(Red) + L}\right\}(1 + L) \, SAVI$$

where L is the soil brightness correction.

Another method that can be used is Principal Component Analysis (PCA). For the bi-temporal change detection process implemented in change analyst 10, PCA is performed on the combined spectral bands of the two temporal images. The spectral bands from the two images are stacked on top of the other and PCA is performed. For example, the six-band data from each LANDSAT ETM+ image is stacked on top of each other and it is treated as a twelve-band dataset.

PCA can be performed on this twelve-band dataset. PCA tries to maximize the variations present in the data, with top order principal components corresponding to the largest variations in the data. The rationale behind utilizing PCA for the change detection process is that after performing PCA, the resulting top-order principal components contain variance information related to major changes in atmospheric or illumination conditions of the temporal images and lower order principal components contain local changes pertaining to ground cover. These lower-order principal components can be utilized for further processing to identify areas of change and no change. Change analyst 10 allows the user to select the spectral bands on which PCA needs to be performed. The user can also select the principal component on which further processing needs to be done to identify areas of change. The user can define appropriate thresholds for creating a binary output image.

A further method that can be used is Spectral Angle Difference. This method utilizes the Spectral angle computed for each pixel of the bi-temporal image. The spectral data at each pixel position is treated as a vector and the vector angle is computed between corresponding vectors of two different temporal images. Let X be the vector representing a particular pixel in image 1 (base image). Let Y be the vector for the corresponding pixel in image 2 (later image). The following equation shows the vector angle calculation for these two vectors:

$$\theta = \arccos \frac{<X, Y>}{\|X\|\|Y\|} \quad (6)$$

An angle of zero degrees represents an identical vector direction for vectors X and Y and an angle of 90 degrees represents the maximum difference in the vector direction for vectors X and Y. The rationale behind employing spectral angle difference for a change detection process is that spectral angles are invariant to illumination variation if the variations are of similar magnitude. Such illumination variations contribute to change in vector length but not in their vector direction. Hence, the hypothesis is that spectral angle difference can be easily related to the changes in land cover and other non-relevant changes pertaining to illumination variation can be eliminated from consideration. The change analyst 10 allows the user to define an appropriate threshold in degrees.

Usually, an optimum threshold value is found by trial-and-error procedures. The accuracy of the pixel-based change detection methods depends upon choosing an optimum threshold value. Since there is no systematic procedure to determine the optimum threshold values, these methods may not be consistent in their reliability and accuracy. Therefore, in order to implement a more systematic determination of the thresholds, a method is used for the automatic selection of an optimum threshold (that can discriminate between the change and no change information). In an embodiment of the invention, the method employed is an auto-thresholding method based on Bayesian probability. This method utilizes the statistical distributions of the changed and unchanged pixels. An unsupervised estimation of the statistical parameters is performed using an Expectation-Maximization (EM) algorithm. In an embodiment of the invention, this method of automatically determining the threshold is employed for the image differencing algorithm.

This method assumes that the probability density of the pixels in the difference image, P(X), can be modeled as a mixture density distribution consisting of probability density functions associated with classes $(\omega_c)$ and $(\omega_n)$, where $(\omega_c)$ and $(\omega_n)$ correspond to change and no change pixels, respectively. As per the assumption, the probability density of the pixels in the difference image P(X) can be written as follows:

$$P(X)=P(X/\omega_c)P(\omega_c)+P(X/\omega_n)P(\omega_n) \quad (7)$$

In an embodiment of the invention, it is assumed that probability density functions, $P(X/\omega_c)$ and $P(X/\omega_n)$, have Gaussian distributions. Hence these distributions can be described using their mean and variance parameters. Unsupervised estimation of these parameters can be performed using the EM algorithm. The EM algorithm starts with an initial value for these parameters. The initial value is determined from the difference histogram by assigning two thresholds $T_c$ and $T_n$. The threshold value $T_c$ corresponds to the change pixels and the threshold value $T_n$ corresponds to no change pixels. The threshold values determine a subset of pixels that belong to classes $\omega_c$ and $\omega_n$. Initial estimates for the mean and variance parameters are calculated using this subset. The threshold values $T_c$ and $T_n$ are calculated using the following equations:

$$T_c=MD(1+\alpha) \quad (8)$$

$$T_n=MD(1-\alpha) \quad (9)$$

where MD is the middle value in the histogram and $\alpha$ is the range around MD where change and no change pixels cannot be easily discriminated. In an embodiment of the invention, a user can be prompted to enter the $\alpha$ value. The $\alpha$ value ranges from 0 to 1. The algorithm estimates the optimum threshold values based on Bayesian probability and returns the binary change image based on these threshold values.

Another method that can be used in the change analyst 10 is Spectral Information Divergence. Similar to spectral angle mapper, this method is also an example for multivariate spectral processing technique. These methods can be utilized when entire spectral information pertaining to a pixel location needs to be compared for change detection rather than determining changes from each band independently. In an embodiment of the invention, the spectral information divergence algorithm is implemented so as to characterize the similarity and dissimilarity of pixel spectra. Hence, the spectral information divergence is explored for the process of change detection from multispectral images. Each pixel can be considered as a vector, where the elements of the vector are reflectance or radiance values measured for different spectral bands. The pixel vector X can be written as $X=\{x_i\}$, where x represents the reflectance or radiance value and i represents the spectral band number.

The pixel vector X can be modeled as a random variable by defining appropriate probability distribution. A probability vector P, is computed from pixel vector X as shown below:

$$P = \left\{ \frac{x_i}{\sum_{j=1}^{L} x_j} \right\} \quad (10)$$

where L represents the total spectral bands and i represents the spectral band number and varies from 1 to L. For a change detection process, the corresponding pixel vectors on both the images are modeled as a random variable and their probability vectors are computed as shown below. If p and q are the probability vectors computed for corresponding pixel vectors X1 and X2 obtained from IMAGE 1 and IMAGE 2, respectively, the spectral information divergence for two vectors X1 and X2 may be computed as follows:

$$SID(X1,X2)=D(X1\|X2)+D(X2\|X1) \quad (11)$$

where, $$D(X1\|X2) = \sum_{i=1}^{L} p_i \log \frac{p_i}{q_i} \text{ and} \quad (12)$$

$$D(X2\|X1) = \sum_{i=1}^{L} q_i \log \frac{q_i}{p_i} \quad (13)$$

For pixel vectors that are similar to each other, spectral information divergence yields a lower value compared to pixel vectors that are different from each other. For pixel vectors that are substantially the same, the spectral value will be zero. By assigning appropriate threshold values, this method can be utilized to discriminate change pixel vectors from no change pixel vectors. In an embodiment of the invention, this method is implemented in the change analyst 10. This method allows the user to explore the effectiveness of such an information divergence metric in a change analysis process.

Yet another method that can be used is tasseled cap analysis or tasseled cap transformation. The objectives of tasseled cap transformation are: (i) to present a fundamental view for LANDSAT™ data structure, (ii) to establish the underlying lower dimensional data structure, where the data variation are concentrated, and (iii) the transformed features can be directly related with physical scene characteristics. If a multispectral data is subjected to tasseled cap transformation, the tasseled cap features obtained for the temporal images can be directly compared to determine the change information. In an embodiment of the invention, the change analyst 10 is configured to support tasseled cap transformation for both radiance or reflectance values or both. In an embodiment of the invention, three tasseled features, namely brightness, greenness, and wetness can be analyzed for a change detection process. Each of these tasseled cap features directly relate to some of the physical scene characteristics.

The tasseled cap features obtained for the bi-temporal images 1 and 2 are subtracted from each other to obtain a difference image. The difference image represents residual tasseled cap features. Binary change images are obtained by assigning thresholds for the difference images. The change analyst 10 allows the user to assign individual thresholds for the three residual tasseled cap features. An increase in brightness and decrease in greenness and wetness features relate to urban or potential urban growth. This change metric can be utilized to map areas of urban or potential urban development.

Alternatively or in addition to pixel-based change detection 18 (see FIG. 1), region-based change filtering 20 can also be used. In an embodiment of the invention, three region-based algorithms or methods 22, 24, and 26 can be implemented in change analyst 10. However, it must be appreciated that any number of region-based methods can be implemented in change analyst 10, including a single region-based method or a plurality of region-based methods. These methods can be used along with pixel-based change detection methods in an effort to reduce false alarms. The three region-based algorithms are texture-based filtering 22, contextual mapping 24, and morphological processing 26. These methods and their usefulness in reducing false alarm rates are described in the following paragraphs.

In texture-based filtering, texture features are associated with spatial patterns present in an image. Texture features can be used in many applications such as land cover classification, target identification, and image segmentation. However, texture features can also be used for change detection.

In an embodiment of the invention, change analyst 10 utilizes changes in textural information computed from the temporal images along with changes computed from pixel reflectance values to focus in on areas of changes. In an embodiment of the invention, textural parameters are computed only for the pixels that are identified as "change" pixels using pixel-based change detection techniques (for example, using the pixel-based methods described in the above paragraphs) in order to reduce computational expense. The textural features are computed from a gray level co-occurrence matrix (GLCM). Eight different statistical parameters that convey different texture information can be computed from GLCM. The eight statistical parameters are mean, variance, homogeneity, contrast, dissimilarity, entropy, energy, and correlation.

In an embodiment of the invention, these textural features or measures can be calculated using off-the-shelf software packages such as the environment for visualizing images (ENVI) produced by Research Systems Incorporated of Boulder, Colo. ENVI allows a user to choose appropriate window sizes and displacements for computing GLCM. The textural measures calculated with ENVI can be imported into change analyst 10 and then analyzed using change analyst 10 to identify areas of change.

For example, one application where textural measures may be more significant is the identification of urban or potential urban growth. For example, the increase in entropy or decrease in homogeneity can be ascribed to changes from barren land to urban growth. The difference in mean and energy relates to regional change in the image. Such textural change information can be utilized to filter out some of the misclassifications resulting from pixel-based change detection.

Change analyst 10 allows the user to import textural features for any particular band or set of bands. The temporal difference in texture features is computed in terms of Euclidean distance and the temporal difference is shown in the form of a histogram. Individual threshold values can be assigned for all texture parameters. The optimum threshold values for the texture parameters are determined empirically. Similarly to pixel-based change detection, automating the threshold selection for texture parameters can also be performed.

Contextual mapping is a close implementation of the change detection mapping using spatial contextual information. The rationale behind using the spatial contextual information in mapping changed areas is that, in a change detection scenario, a pixel belonging to a particular class is more likely to be surrounded by pixels of the same class. Hence, an efficient use of inter-pixel class dependent information may yield an enhanced change detection strategy.

In an embodiment of the invention, in order to evaluate the inter-pixel dependency, a spatial neighborhood system is considered. For a pixel with co-ordinates (i,j), N (i,j) is the set containing the neighboring pixels. Table 1 shows the neighborhood pixels for pixel coordinate (i,j) in a second order neighborhood system.

TABLE 1

| (i − 1, j − 1) | (i − 1, j) | (i − 1, j + 1) |
| (i, j − 1)     | (i, j)     | (i, j + 1)     |
| (i + 1, j − 1) | (i + 1, j) | (i + 1, j + 1) |

According to Markov modeling, the conditional probability distribution for a pixel label at coordinate (i,j), given the neighboring pixel labels is given by the following equation, where C(i,j) is the pixel label (change and no change labels) for the pixel at co-ordinate (i,j):

$$P(C(i,j)/C(g,h),(g,h)\neq(i,j))=\tfrac{1}{2}\exp(-U(C(i,j)/\{C(g,h)(g,h)\in N(i,j)\})) \qquad (14)$$

where U is the Gibbs energy function and Z is the normalizing factor. The Gibbs energy function is given by the following equation:

$$U(C(i,\ j)/\{C(g,\ h)(g,\ h)\in N(i,\ j)\})=\sum_{(g,h)\in N(i,j)}\beta\delta_k(C(i,\ j)C(g,\ h)) \qquad (15)$$

where $\delta_k$ is the Kronecker delta function and $\beta$ is the weight associated with each neighbor.

$$\delta_k(C(i,\ j)C(g,\ h))=\begin{cases}1, & C(i,\ j)=C(g,\ h)\\ 0, & C(i,\ j)\neq C(g,\ h)\end{cases} \qquad (16)$$

On the other hand, the classification of the difference gray level value (assuming that the image differencing algorithm is used for change detection) into its pixel label (change class and no change class) is based on the maximum-likelihood classification strategy. This can be expressed as follows:

$$U(X(i,j),C(i,j))=-\tfrac{1}{2}\ln|2\pi\sigma_{c(i,j)}{}^2|-\tfrac{1}{2}(X(i,j)-\mu_{c(i,j)})^2[\sigma_{c(i,j)}{}^2]^{-1} \qquad (17)$$

where $\sigma^2_{c(i,j)}\in\{\sigma_{change}{}^2,\ \sigma_{nochange}{}^2\}$ and $\mu^2_{c(i,j)}\in\{\mu_{change}{}^2,\ \mu_{nochange}{}^2\}$.

The final change detection mapping strategy may be based on maximizing the below energy function which includes both the contextual energy factor and maximum-likelihood energy factor for the difference gray level pixel value.

$$U(X_D, C) = \sum_{(i,j)} [U(X(i, j), C(i, j)) + U(C(i, j) / C(g, h) | (g, h) \in N(i, j))] \quad (18)$$

Change analyst 10 enables a user to design different order neighborhood systems with different weights assigned to each of the neighbors.

In an embodiment of the invention, change analyst 10 may also include morphological processing 26. In an embodiment of the invention, the morphological processing 26 includes component labeling and filtering. This morphological processing allows the user to connect unconnected pixels of a same class that are separated by a pixel distance and remove pixel groups of a same class having group size less than the user-specified threshold. Unlike the contextual mapping described above, this filtering process does not consider the inter-pixel dependence information. Hence, this processing method can be computationally less expensive compared to the previous algorithm and can be used to remove stray pixels or pixel groups that are considered to be noise.

After performing a computation using one or more of the methods described above, change analyst 10 is able to display the binary image representing the change pixels and no change pixels as an output 28 on the change view display window 30, shown in FIG. 3.

Figure 4B:
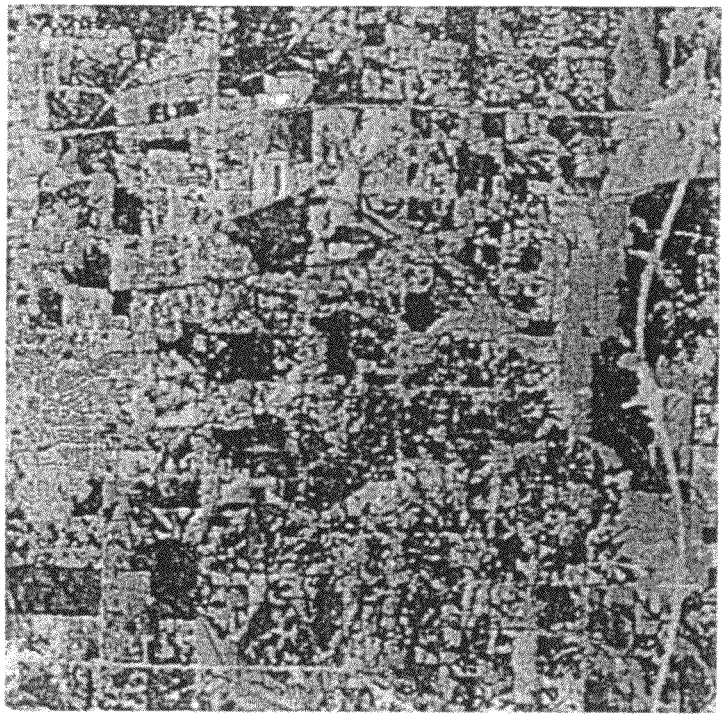
FIG. 4B shows a sub-set of a Shelby county image taken in 2003.
Figure 4A:
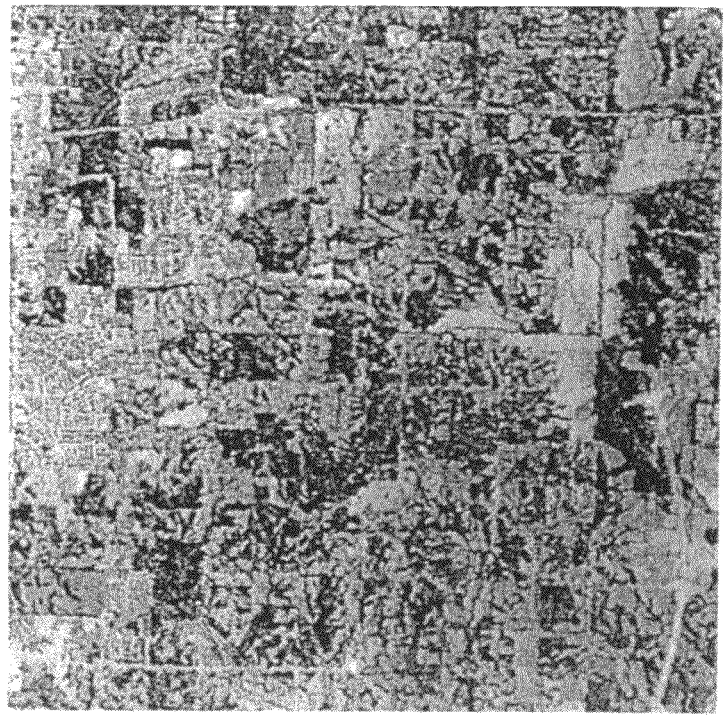
FIG. 4A shows a sub-set of a Shelby county image taken in 2001.

In the following paragraphs, a few examples of case studies performed using change analyst 10 described above are discussed. A bi-temporal Landsat ETM+ data for the years 2001 and 2003 are used for detection of land cover changes in the vicinity of Memphis, Tenn. FIGS. 4A and 4B show the subset of Shelby county ETM+ images used for the case studies discussed herein. FIG. 4A shows a sub-set of a Shelby county image taken in 2001 and FIG. 4B shows a sub-set of a Shelby county image taken in 2003.

The satellite imageries are normalized by converting the images from DN values to at-sensor reflectance, for example by using the DN to at-sensor reflectance transformation described above. For the first two case studies, band 3 of the LANDSAT ETM+ data is used for analysis.

In the first case study, the optional use of texture filters for identifying pseudo change is demonstrated. Three texture parameters considered for this example are mean, homogeneity, and energy. TABLE 2 below shows the details of the computation of these texture parameters from GLCM. N in the formulas represents the total number of pixels.

TABLE 2

| Textural Parameter | Formula |
| --- | --- |
| Mean | $\frac{1}{N^2} \sum_{ij}^{N-1} C_{ij}$ |
| Homogeneity | $\sum_{ij}^{N-1} \frac{1}{1+|i-j|} C_{ij}$ |
| Energy | $\sum_{ij}^{N-1} C_{ij}^2$ |

As mentioned in the previous section, differences in homogeneity parameters computed for the bi-temporal images can be ascribed to the structural changes over the land. The differences in energy and mean parameters can be used to measure variability around a pixel. The differences in textural parameters computed for the bit-temporal images are used to refine the change detection results obtained from the band differencing algorithm. The three textural parameters are computed from the GLCM matrix obtained by considering a 0-by-9 window around each pixel. A unit displacement vector is considered both in the X and Y directions. For the band differencing threshold values, these values are determined empirically with the help of a difference histogram 32 displayed in the change view window 30 of change analyst 10 (shown in FIG. 3). The lower threshold is set to −0.05 and upper threshold is set to +0.075.

Figure 5B:
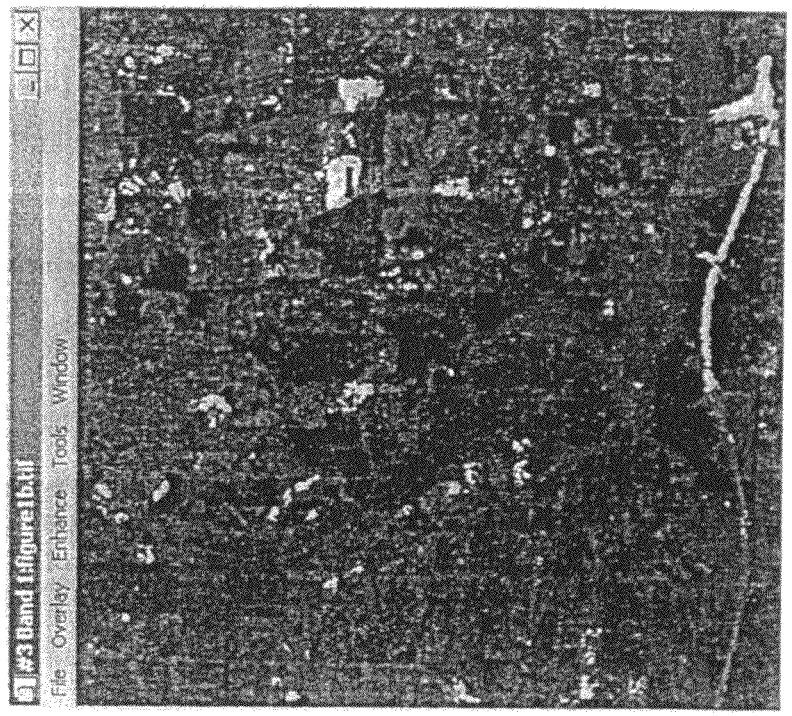
FIG. 5B displays the refined output obtained by refining the band differencing result shown in FIG. 5A using texture information, according to an embodiment of the invention.
Figure 5A:
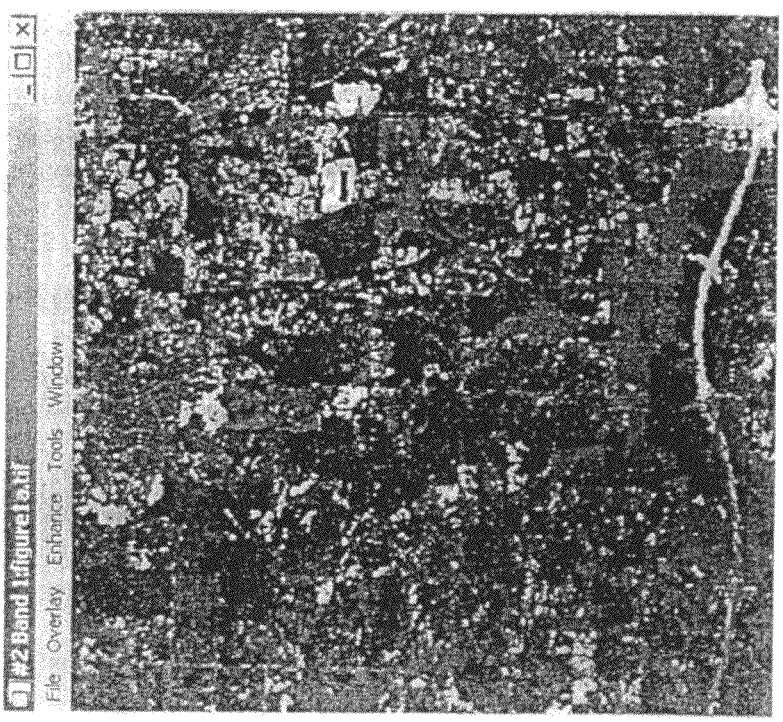
FIG. 5A displays the results obtained by using a band differencing algorithm, according to an embodiment of the invention.

FIG. 5A displays the results obtained by using band differencing algorithm for band 3 of ETM+ data. The changes are displayed as white pixels overlaid on top of the Shelby county image of 2003 (shown in FIG. 4B). FIG. 5B displays the refined output obtained by refining the band differencing result using texture information. The changes are displayed as white pixels overlaid on top of the Shelby county image of 2003 (shown in FIG. 4B) after refining the band differencing results using texture information. It can be seen from the results that the filtering process utilizing texture information leads to a refined output with reduced pseudo change.

In a second case study, the optional use of spatial contextual information for reducing pseudo change is demonstrated. The spatial contextual information is utilized to further refine the change detection results obtained from performing baud differencing on band 3 of ETM+ data. Change analyst 10 allows the user to have different window sizes. In addition, different weights can be assigned to neighborhood pixels. In order to extract linear change features, longer or taller rectangular windows can be considered.

Figure 6B:
FIG. 6B displays the refined output obtained by filtering the band differencing results shown in FIG. 5A using spatial contextual information, according to an embodiment of the invention.
Figure 6A:
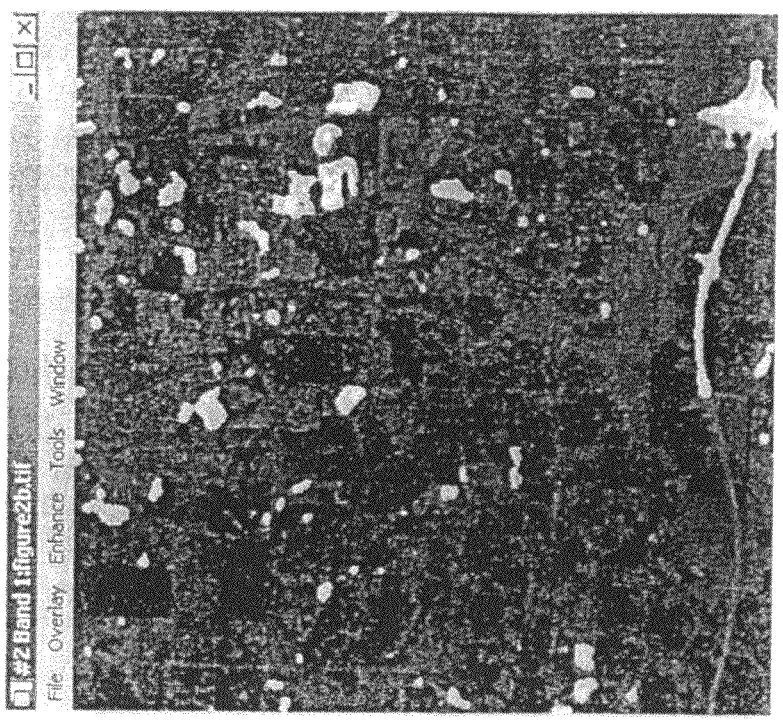
FIG. 6A displays the refined output obtained by refining the band differencing result shown in FIG. 5A using spatial contextual information, according to an embodiment of the invention.

FIG. 6A displays the refined output obtained by refining the band differencing result using spatial contextual information by considering a 5-by-5 kernel window around each change pixel. The change pixels are displayed in white after performing contextual filtering using the 5-by-5 kernel window around each pixel.

FIG. 6B displays the refined output obtained by filtering the band differencing results using spatial contextual information by considering a 3-by-9 kernel window around each change pixel. The change pixels are displayed in white after performing contextual filtering using the 3-by-9 kernel window around each pixel.

In the third case study, spatial contextual information is utilized to refine the change detection output obtained from tasseled cap analysis. The difference in the tasseled cap components can be used to detect changes pertaining to urban growth. The three tasseled cap components used in this change detection analysis are brightness, greenness, and wetness. The increase in brightness and decrease in greenness can be used as an attribute to indicate urban or potential urban growth. The LANDSAT ETM+ images are transformed into tasseled cap components. In an embodiment of the invention, tasseled cap coefficients used in change analyst to perform this conversion can be found, for example, in "Derivation of a Tasseled Cap Transformation Based on Landsat 7 At-satellite Reflectance," by Huang et al., International Journal of Remote Sensing, vol. 23, n. 8, pp. 1741-1748, 2002. The band-differencing algorithm is applied to each of the tasseled cap components computed for the temporal images. Individual thresholds are assigned to each of the tasseled cap difference values. Thresholds are set such that an increase in brightness or decrease in greenness or decrease in wetness is considered as a change pixel.

Figure 7:
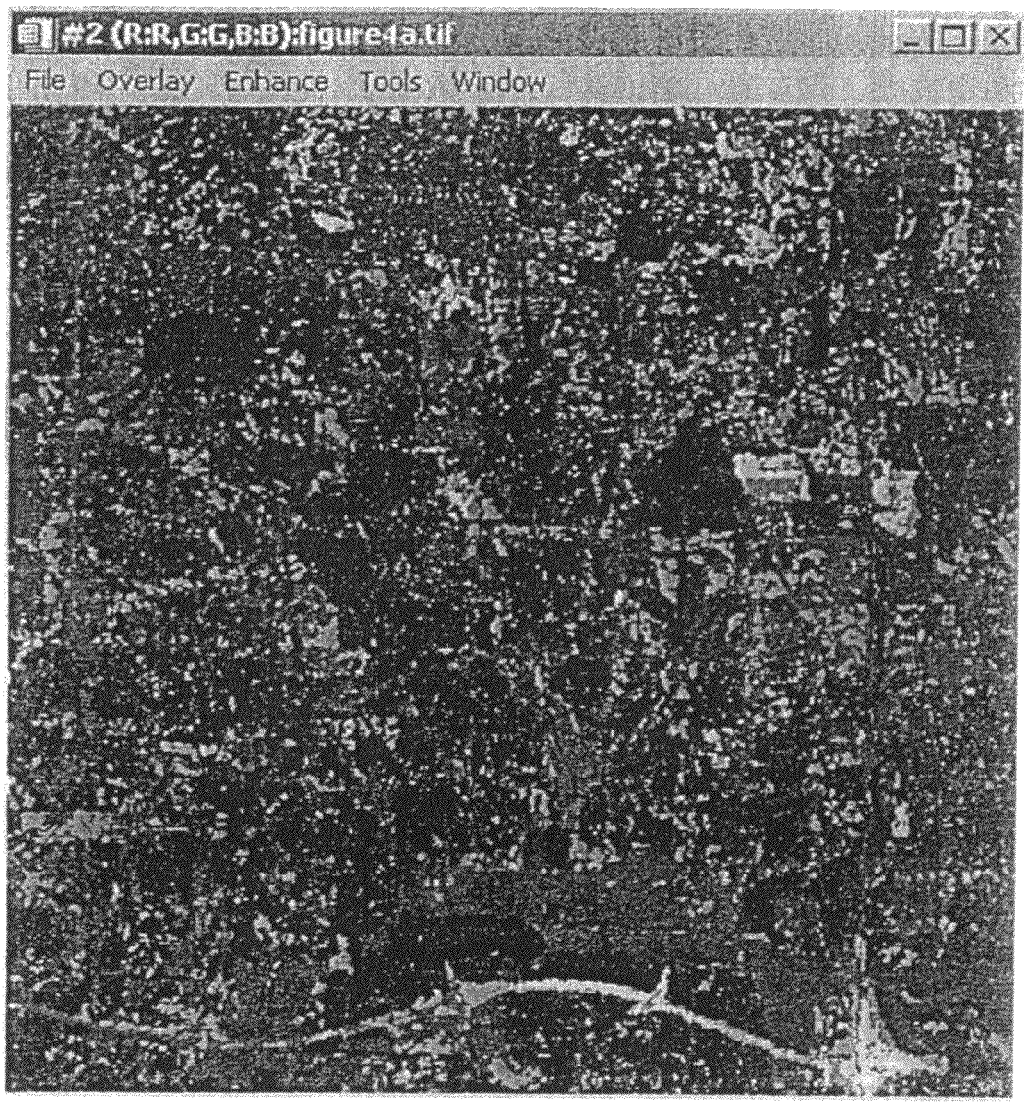
FIG. 7 shows the change pixels in "red, blue, green" or their combined color obtained from tasseled cap analysis, according to an embodiment of the invention.

FIG. 7 shows the change pixels in red, blue, green or their combined color. Red indicates the increase in brightness, green indicates the decrease in greenness, and blue indicates the decrease in wetness. Hence a change pixel of color yellow would indicate an increase in brightness and decrease in greenness. The spatial contextual information is used to further refine the change detection results obtained from tasseled cap analysis.

Figure 8:
FIG. 8 displays the refined output obtained by refining the tasseled cap analysis results in FIG. 7 using spatial contextual information, according to an embodiment of the invention.

FIG. 8 displays the refined output obtained by refining the tasseled cap analysis results using spatial contextual information by considering a 5-by-5 window around each pixel. Contextual filtering is performed over each tasseled cap components independently. It is evident from FIG. 7 and FIG. 8 that utilization of region based filters along with pixel-based change detection methods is an effective method to reduce the commission errors which may be prohibitive for certain applications.

As discussed in the above paragraphs, change detection involves calculating the magnitude of change between the pixels in the two images. If the magnitude of change in a pixel is equal to or above a pre-defined threshold, the pixel is assigned to change. If, on the other hand, the magnitude of change is below a pre-defined threshold, the pixel is assigned to no-change. Usually a reasonable threshold is found by using a manual trial-and-error procedure. However, the determination of a reasonable threshold value involves many parameters including an a priori knowledge about the site under study.

Threshold evaluation for change detection using modified histograms can be implemented. In an embodiment of the invention, systematic methods to determine reasonable threshold values for change detection techniques are based on differencing images. For example, univariate image differencing, vegetation index differencing, or PCA are change detection methods that are based on differencing images.

These methods include computing the pixel level difference of two images (spectral or transformed) obtained at different dates. The difference image is then analyzed to determine areas of change. In the difference image, pixels having higher intensity values are indicators of change locations and pixels having lower intensity values are indicators of no-change locations. Thresholding plays a role in segmenting the difference image into change and no-change areas. Threshold values can be determined by observing the plot of probability distribution function (PDF) or histogram of the pixel intensity values.

The number of pixels with difference value i is denoted by $n_i$. The total number of pixels can be written as follows:

$$n = \sum_{0}^{L} n_i \quad (19)$$

where $\{0, 1, \ldots L\}$ is the set of possible absolute difference values a difference image pixel can take. The probability distribution of the pixel intensity for the difference image is obtained by plotting p, against i ($i \in \{0, 1, \ldots L\}$) and $p_i$ can be expressed as follows:

$$p_i = \frac{n_i}{n} \quad (20)$$

It can be seen from equation (20) that PDF plots can be derived from histograms by dividing each binary value ($n_i$) by the total number of pixels (n). The PDF of the pixel intensity values follows a Gaussian distribution. In cases where the probability distribution is bimodal and the two peaks are clearly separated from one another, it is relatively easy to identify a threshold value in the bottom of the valley that separates these peaks. However, often in practical applications such cases do not occur. In most cases, the distribution appears to be unimodal, which makes it difficult to identify a threshold by observing the probability distribution. Even though the PDF may be bimodal, for certain cases the peaks of the probability distribution may display large differences in their heights which renders the peaks difficult to distinguish. Yet, for certain cases the valley between the peaks is not deep enough to distinguish the two peaks. Hence, it may be very difficult to select a reasonable threshold by observing the PDF of the pixel intensity. As a result, a reasonable threshold value is often determined through a manual trial-and-error procedure. In this case, it is assumed that the user has some prior knowledge about the areas of change, so as to perform the trial-and-error procedure.

Systematic threshold determination for change detection can be tackled in different ways. In many of the traditional change detection techniques, threshold is determined from the change information contained within a pixel and does not take into account the information contained in the neighboring pixels. In a change detection application using remotely sensed data (e.g., images), often changes occur in clusters or connected pixels rather than disjoint pixels. In an embodiment of the invention, modified histograms can be used for systematically determining reasonable threshold values. These modified histograms are generated by taking into account the spatial contextual information of pixel intensity values.

Several methods may be contemplated for generating a transformed histogram where peaks are easier to discriminate or the detection of the valley between peaks is facilitated. In an embodiment of the invention, a gray level co-occurrence matrix (GLCM) histogram can be used as a modified histogram.

GLCM can be defined as a matrix whose elements (i, j) represent the number of times pixel with gray level j occurs in image I with a displacement D relative to pixel with gray level i. The displacement D is a function of distance d and angle θ. In this case GLCM is symmetric, since elements (i, j) and (j, i) contain the same information. The GLCM matrix can be arranged in such a way that element (0, 0) is on the upper left corner and the gray level increases towards the right and towards the bottom.

In order to demonstrate the effectiveness of GLCM histogram for threshold determination method, it may be worthwhile to consider an example. In the example, the objective is to determine an appropriate threshold value to segment the test image shown in FIG. 9A into change areas and no change areas. The test image I shown in FIG. 9A can be assumed to be absolute difference image obtained by applying any of the change detection techniques (for example, the change detection methods described in the above paragraphs). Therefore, each pixel intensity value represents the magnitude of change. The pixel intensity value ranges from 0 to 32. The regions A1 and A2 marked inside the square are considered to be the regions of change.

Figure 9B:
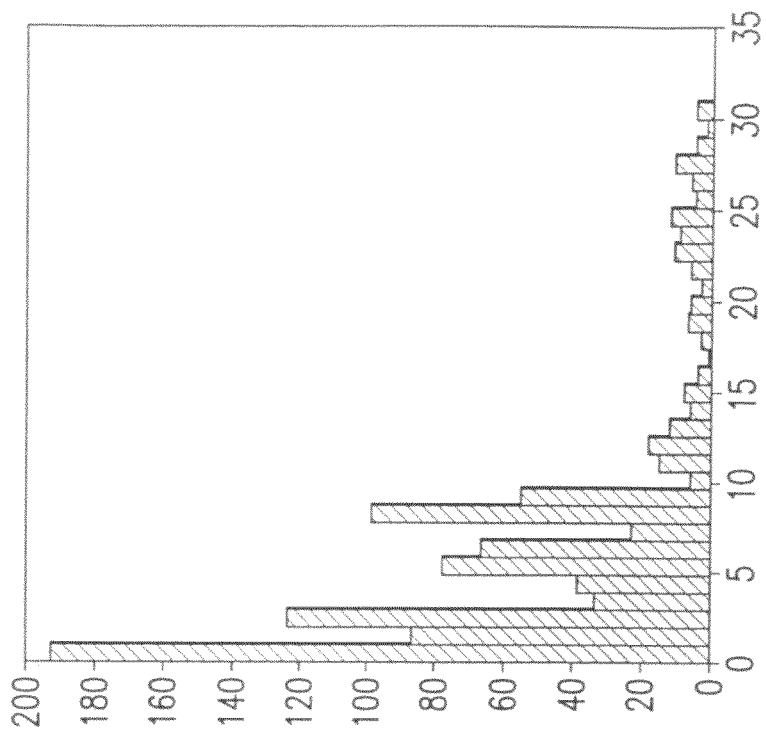
FIG. 9B shows a histogram of pixel intensity values for the test image shown in FIG. 9A.

FIG. 9B shows the histogram of pixel intensity values for the test image. The scale on the X-axis of the histogram ranges from 0 to 32. It can be observed from FIG. 9B that the pixel intensity histogram for the test image does not offer any valid clue for a reasonable threshold value and hence empirical methods need to be used to find an appropriate threshold value. However, such empirical methods are dependent on a priori knowledge about the test image I.

Figure 10A:
FIGS. 10A-I show different threshold values being tried before selecting a reasonable threshold value.
Figure 10B:
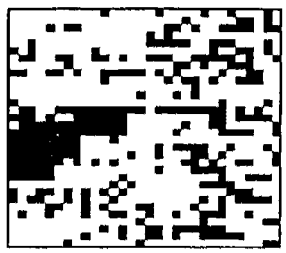
Figure 10C:
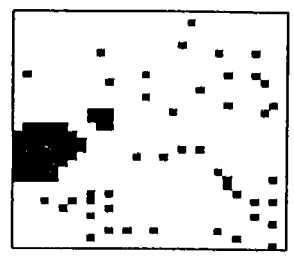
Figure 10D:
Figure 10E:
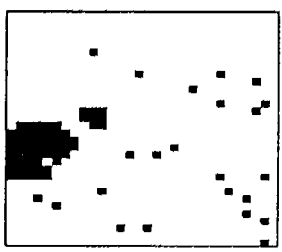
Figure 10F:
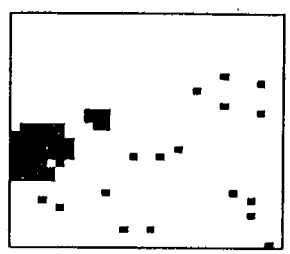
Figure 10G:
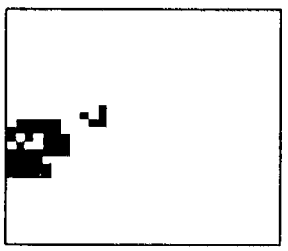
Figure 10H:
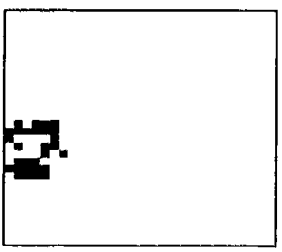
Figure 10I:
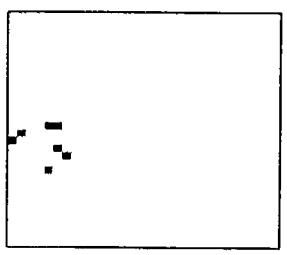

FIGS. 10A-I show different threshold values being tried before selecting a reasonable threshold value. In FIG. 10A a threshold value of 5 is used. In FIG. 10B a threshold value of 8 is used. In FIG. 10C a threshold value of 15 is used. In FIG. 10D a threshold value of 18 is used. In FIG. 10E a threshold value of 20 is used. In FIG. 10F a threshold value of 22 is used. In FIG. 10G a threshold value of 25 is used. In FIG. 10H a threshold value of 27 is used. In FIG. 10I a threshold value of 30 is used. In this case, a threshold value of 22 can be considered as reasonable to identify the change areas. Thus, the output image in FIG. 10F is considered reasonable.

Figure 11A:
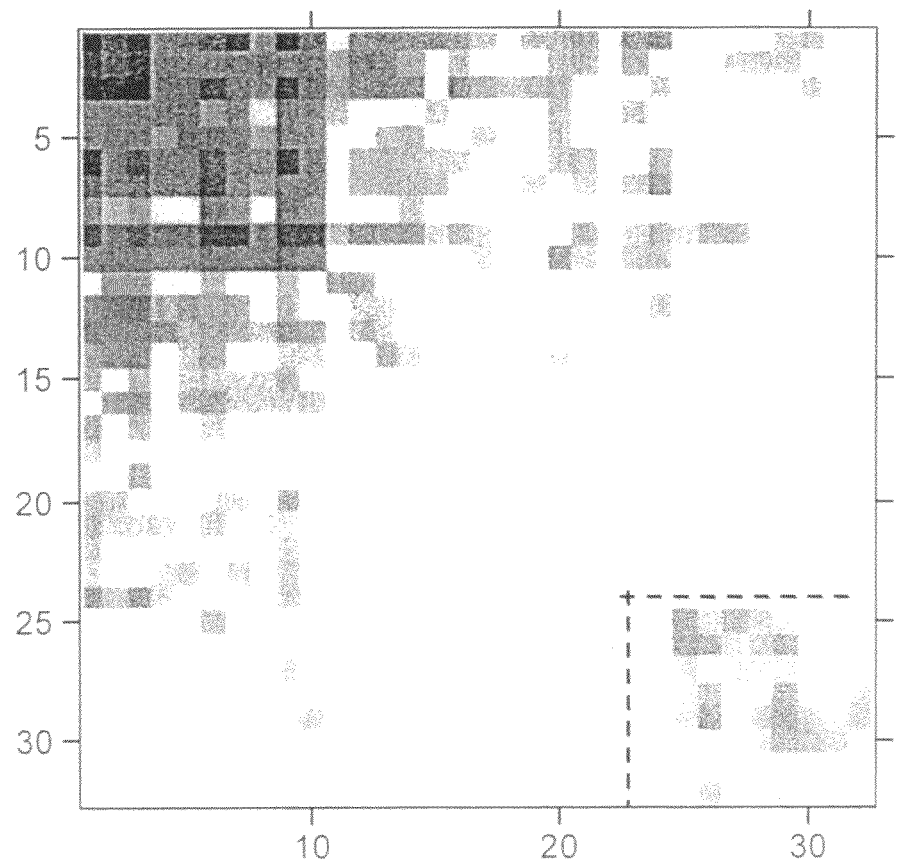
FIG. 11A shows the gray level co-occurrence matrix calculated for the test image shown in FIG. 9A, according to an embodiment of the invention.

FIG. 11A shows the GLCM calculated for the test image I, according to an embodiment of the present invention. The GLCM is shown in logarithmic scale for display purposes. GLCM is symmetric about its diagonal. Elements near the upper left corner and closer to the main diagonal of GLCM correspond to pixels having low intensity values and having similar pixels that do not differ significantly in their intensity values from neighboring pixels. These elements correspond to no-change areas. GLCM elements near the lower right corner and closer to the main diagonal correspond to pixels having high intensity and having similar pixels that do not differ much in their intensity values from neighboring pixels. These elements correspond to change areas. GLCM elements that are away from the main diagonal correspond to areas where pixels have high intensity values and are neighbored by pixels having low difference values.

By observing the GLCM histogram shown in FIG. 11A, a reasonable threshold value can be derived for separating change areas from no change areas. A reasonable threshold value in this case would be gray level value (marked by a dotted line) in between the two clusters located at the upper left corner and lower right corner. However, in some situations it may not be possible to determine a threshold value by observing the corresponding GLCM histogram. Hence, robust threshold evaluation methods may be employed for such cases to systematically derive an appropriate threshold value from GLCM histograms. These methods are discussed in the following paragraphs.

In another embodiment of the invention, another method using gray level versus local gray level histogram for generating a transformed histogram is considered. In an embodiment of the invention, a gray level versus local gray level matrix is defined by elements (i,j), where i represents the gray level of a pixel and j represents the average gray level estimated around this pixel within a local neighborhood in an image I. The matrix entries represent number of times pixel pair (i, j) occurs in image I. The entries of the matrix along the diagonal represent image pixels where the gray level and the local gray level are the same. In a change detection scenario, elements that are closer to the upper left corner correspond to unchanged pixels and elements closer to the lower right corner correspond to change pixels.

Figure 9A:
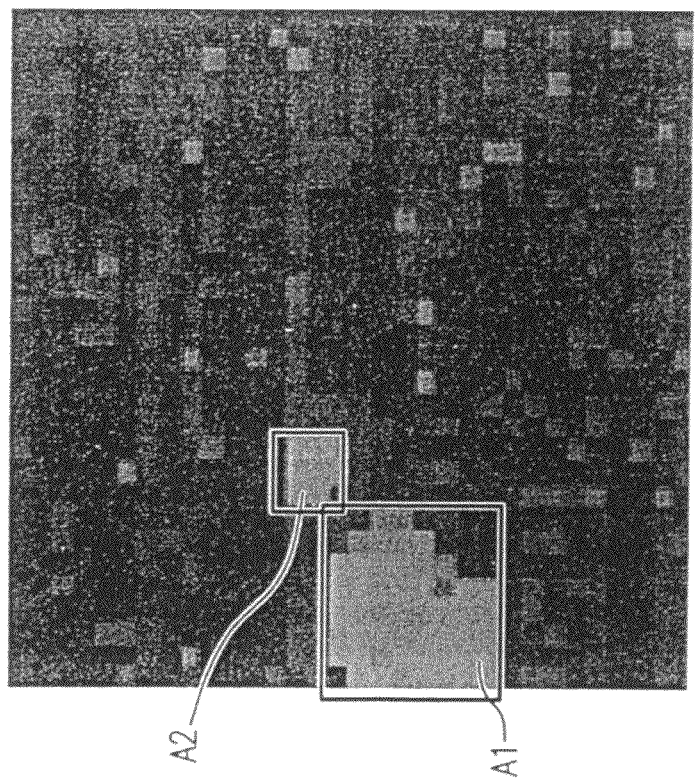
FIG. 9A shows a test image obtained by applying a change detection technique, according to an embodiment of the invention.
Figure 11B:
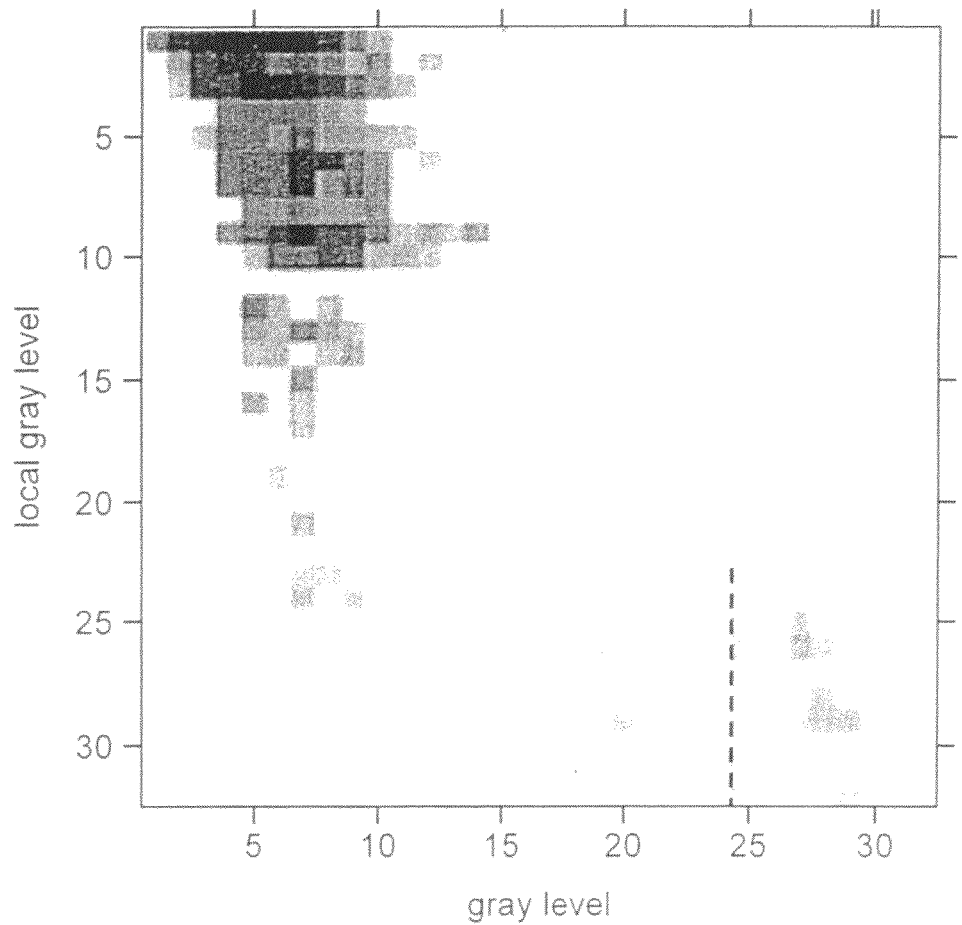
FIG. 11B shows a gray level versus local gray level histogram, according to an embodiment of the invention.

The gray level versus local gray level histogram is generated for the test image I shown in FIG. 9A. In an embodiment of the invention, a local 3-by-3 pixel neighborhood is considered. However, it must be appreciated that the use of other neighborhood areas (for example a neighborhood defined by 4-by-4 pixels) are also within the scope of the present invention. FIG. 11B shows the histogram in logarithmic scales. Similar observations discussed in the prior paragraphs with respect to a GLCM histogram hold true for this case also. Instead of adopting a trial-and-error procedure for evaluating appropriate threshold values from pixel intensity histogram, a reasonable threshold value can be determined by observing the gray level versus local gray level histogram shown in FIG. 11B. In this case, a threshold value around gray level 24 can be used for segmenting the image. The threshold value is marked by a dotted line in between the two clusters located at the upper left corner and lower right corner, as shown in FIG. 11B.

In the following paragraphs, threshold evaluation methods that can be implemented to determine an appropriate threshold value from these histograms are described.

In an embodiment of the invention, in order to determine a threshold from the above histograms, the main diagonal elements are plotted. This resulting plot represents peaks corresponding to the gray level values which contribute to the no-change areas and to the gray level values which contribute to the changed areas. Usually, for change detection application using remotely sensed data, the number of no-change pixels will be significantly larger than the change pixels. Hence, in most cases, peaks will have large differences in their heights which may render the peaks difficult to separate. In addition, as stated above, for certain cases the valley between the peaks will not be deep enough to distinguish the two peaks. In the case of change detection applications involving remotely sensed data, a reasonable assumption can be made in that changes occur in connected points or as clusters rather than disjointed points. Hence, a reasonable threshold value would be the value that can identify all the connected change points.

A metric is used for the determination of the reasonable threshold value. This metric corresponds to a busyness measure for the co-occurrence matrix or gray level versus local gray level matrix. The busyness measure $B_t$ can be expressed as follows:

$$B_t = \sum_{i=t+1, j=i}^{L} M(i, j) \tag{21}$$

where M represents the co-occurrence or gray level versus local gray level matrix, t represents the threshold value, and L represents the maximum gray level.

Figure 12:
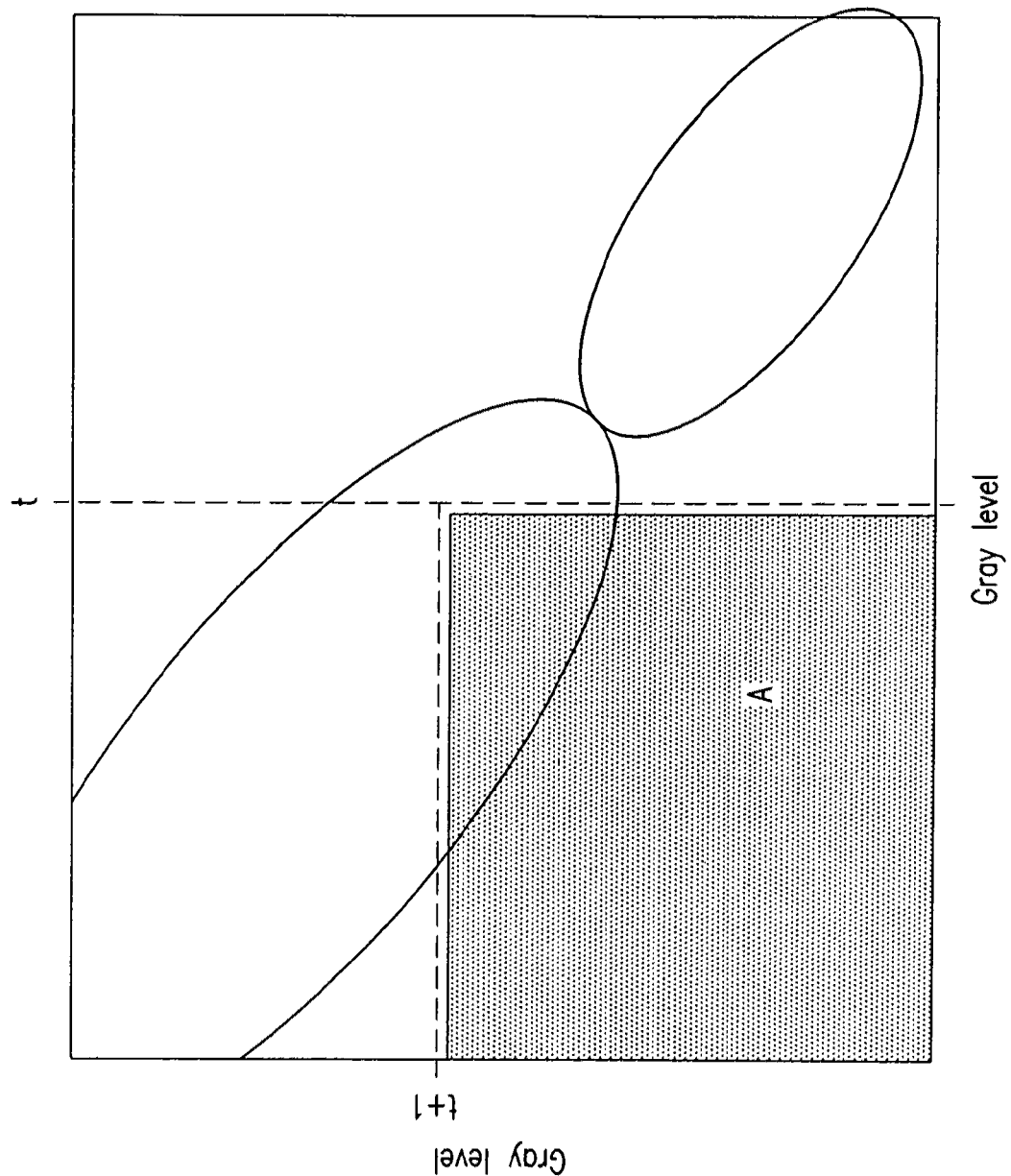
FIG. 12 shows a pictorial representation of a calculation, according to an embodiment of the invention.

FIG. 12 shows a pictorial representation of the above calculation. The sum of the elements under the region marked A in FIG. 12 represents the busyness measure value for threshold. A reasonable threshold value is located where the slope of the busyness measure changes (on the shoulder of the busyness curve). Busyness measurement criterion is supplemented by another metric computed using the inverse difference moment of matrix M.

The inverse difference moment for each gray level value computed from the co-occurrence matrix or gray level versus local gray level matrix can be defined as follows:

$$I_t = \sum_{i=1}^{t} \frac{1}{1 + (i+t)} M(i, t) \tag{22}$$

The inverse difference moment measures a contribution from the diagonal element. In the case of change detection applications, since the changes normally occur in clusters, the inverse difference moment computed for the gray levels will show two peaks corresponding to the diagonal elements towards the upper left corner and diagonal elements toward the lower right corner.

Figure 13A:
FIGS. 13A and 13B show two 16 bit temporal images used in an example, according to an embodiment of the invention.
Figure 13B:
Figure 14:
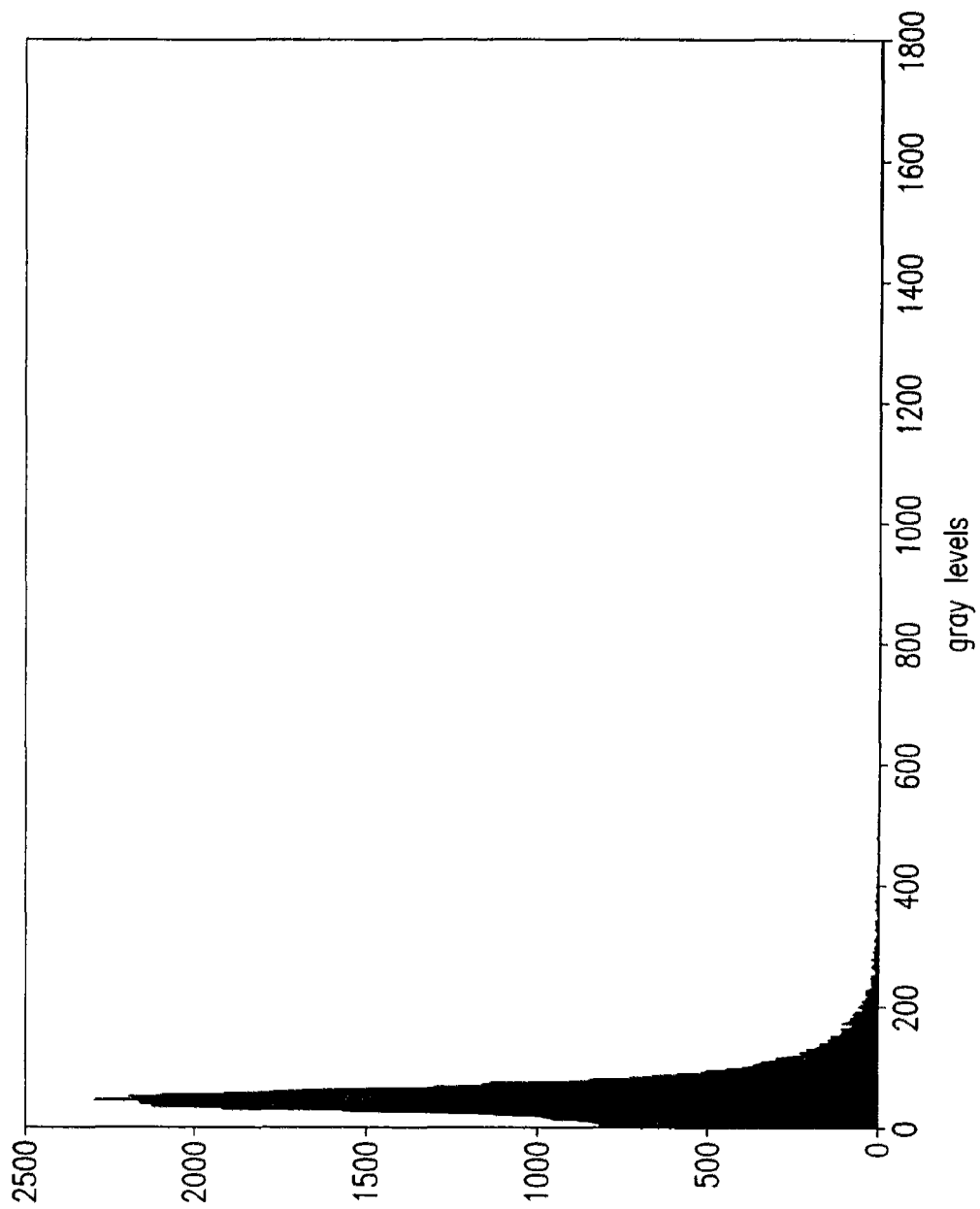
FIG. 14 shows a histogram of the difference values obtained after performing a univariate absolute image differencing on the two images shown in FIGS. 13A and 13B, according to an embodiment of the invention.

To demonstrate the effectiveness of the aforementioned threshold evaluation criterion or method, the threshold evaluation is used to identify areas of change from Quick Bird Imagery for the Starkville, Miss. area. In an embodiment of the invention, band 2 of the QuickBird image is used. However, it must be appreciated that other bands and/or other image systems can also be used. FIGS. 13A and 13B show the two 16 bit temporal images used in this example. FIG. 14 shows the histogram of the difference values obtained after performing a univariate absolute image differencing on these two images, i.e., images shown in FIGS. 13A and 13B.

Figure 15:
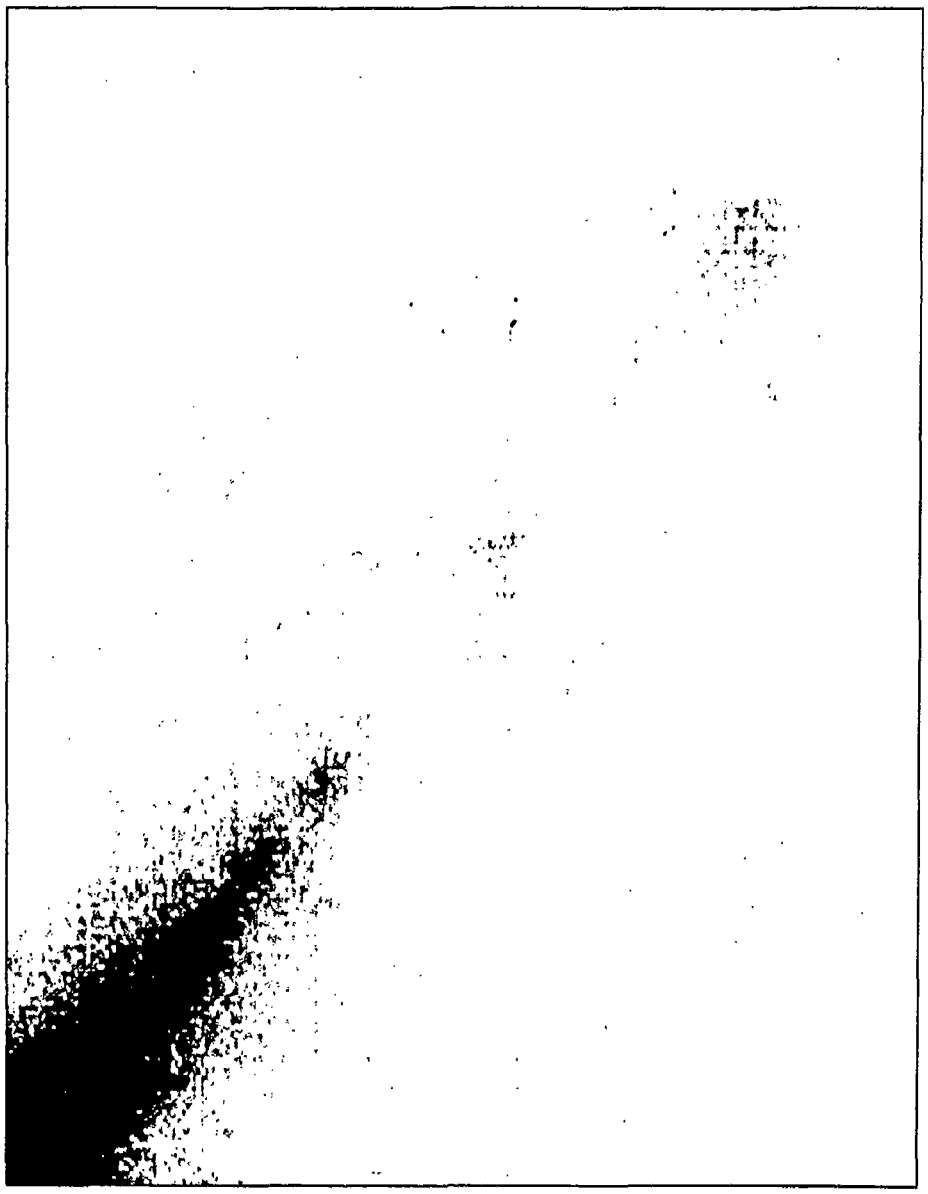
FIG. 15 shows a co-occurrence histogram calculated for the difference image of images shown in FIGS. 13A and 13B.
Figure 16A:
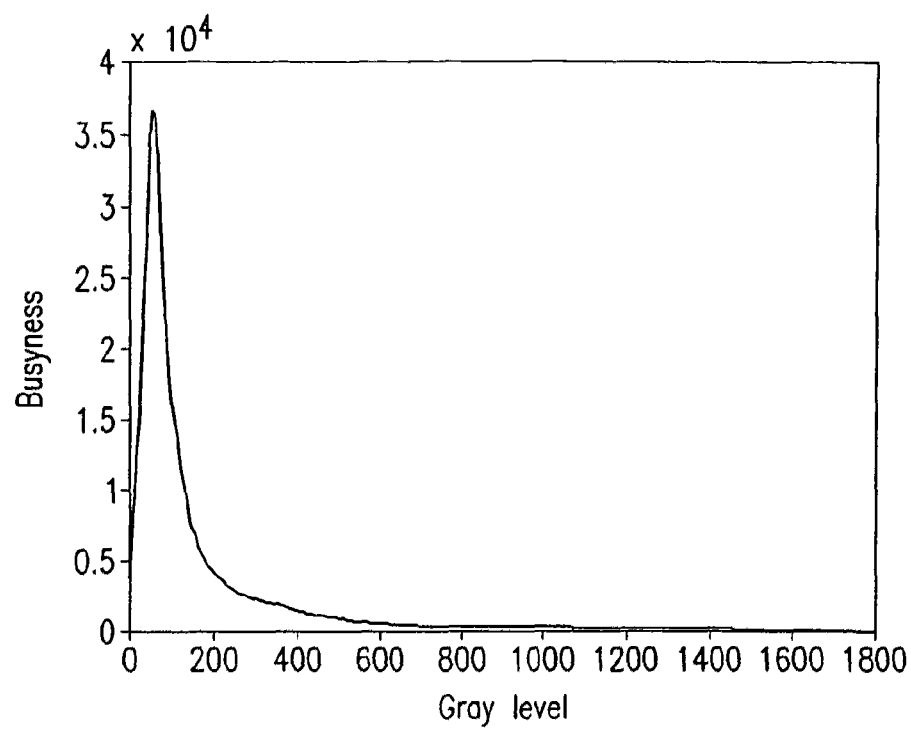
FIGS. 16A and 16B show a busyness plot and inverse difference moment plot, respectively, computed from a co-occurrence histogram, according to an embodiment of the invention.
Figure 16B:
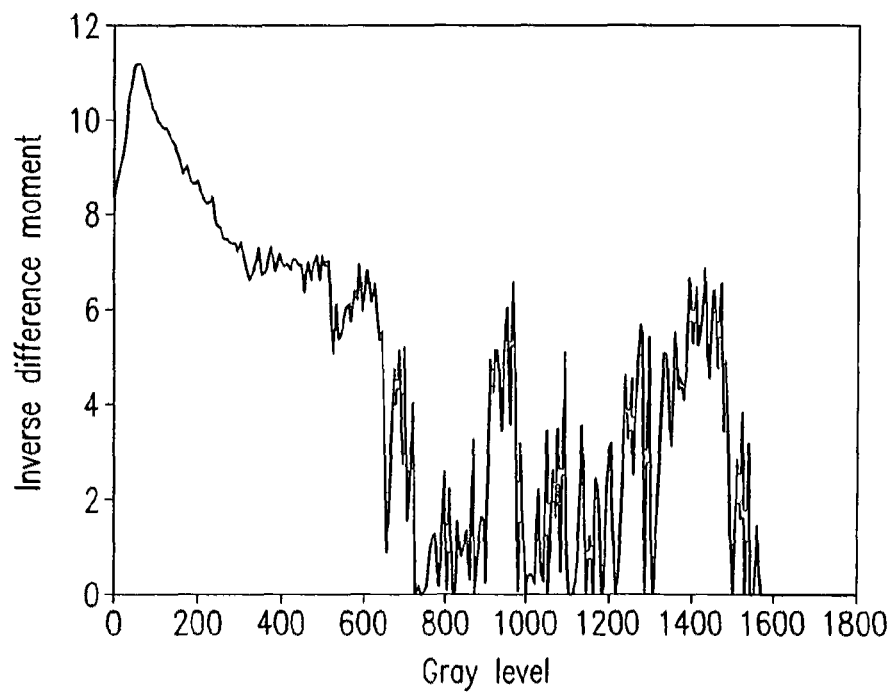

In an embodiment of the invention, a co-occurrence histogram is used to determine a reasonable threshold value for segmenting the image into change and no change areas. FIG. 15 shows the co-occurrence histogram calculated for the difference image. FIGS. 16A and 16B show the busyness plot and inverse difference moment plot, respectively, computed from the co-occurrence histogram.

Figure 17:
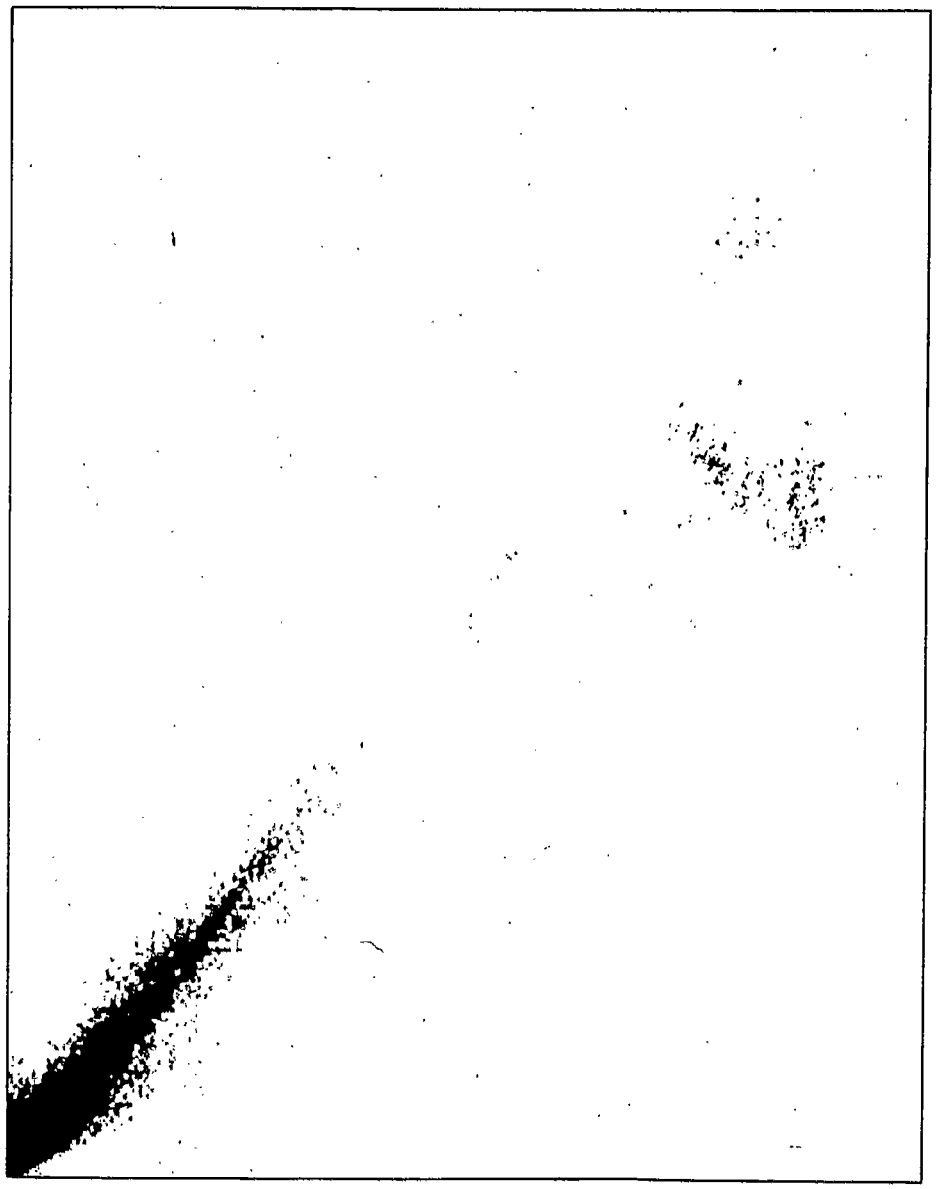
FIG. 17 shows a gray level versus local gray level histogram, according to an embodiment of the invention.
Figure 18A:
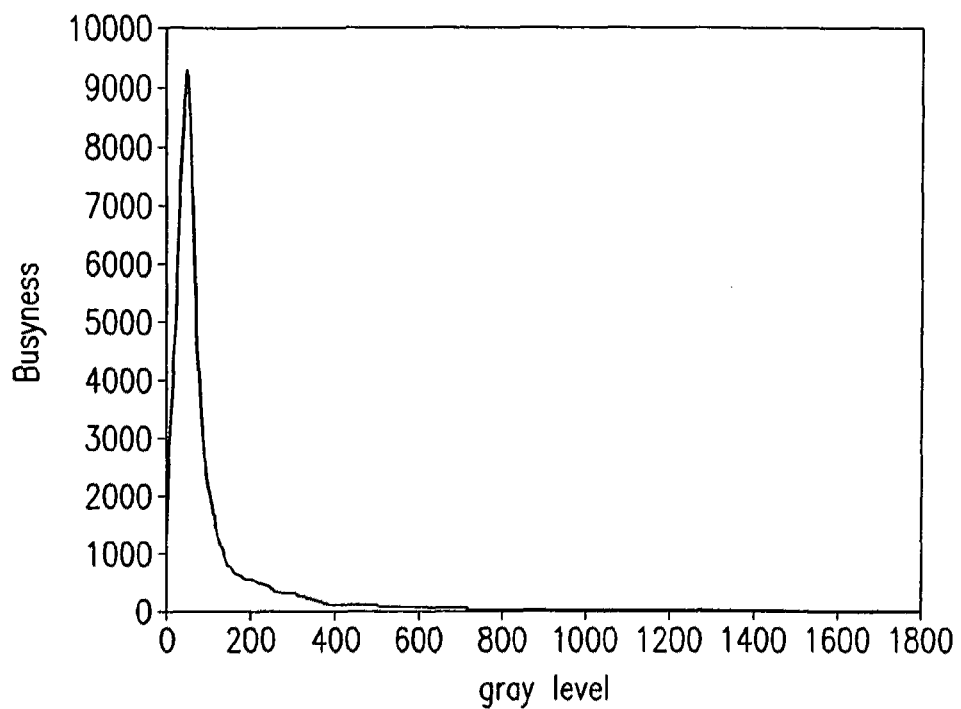
FIGS. 18A and 18B show the busyness plot and inverse difference moment plot, respectively, computed from the histogram shown in FIG. 17.
Figure 18B:
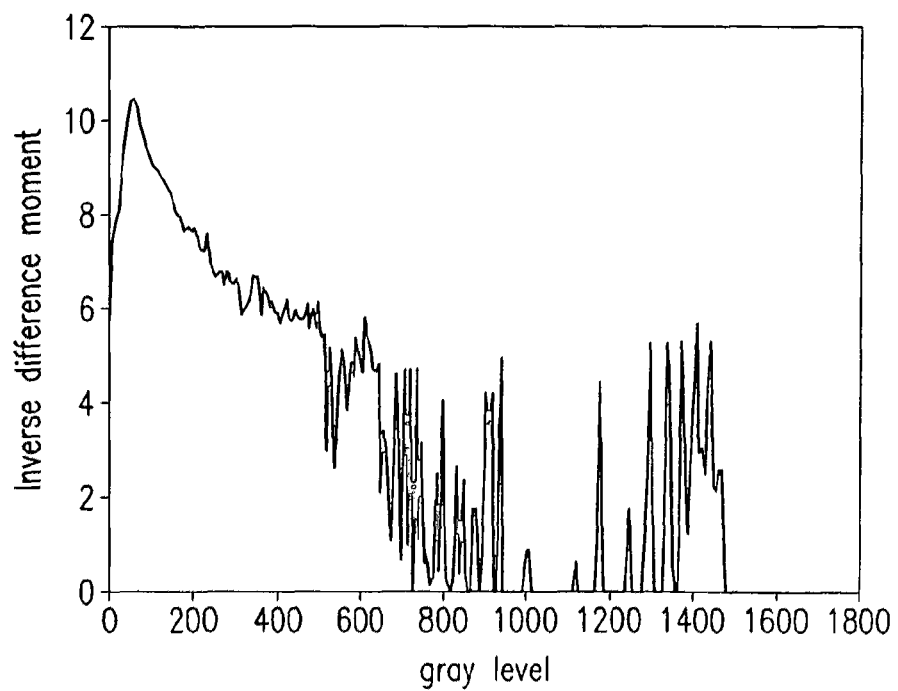

In another embodiment of the invention, gray level versus local gray level histogram is used in identify an appropriate threshold value. FIG. 17 shows the gray level versus local gray level histogram. FIGS. 18A and 18B show the busyness plot and inverse difference moment plot, respectively, computed from the histogram.

Figure 19A:
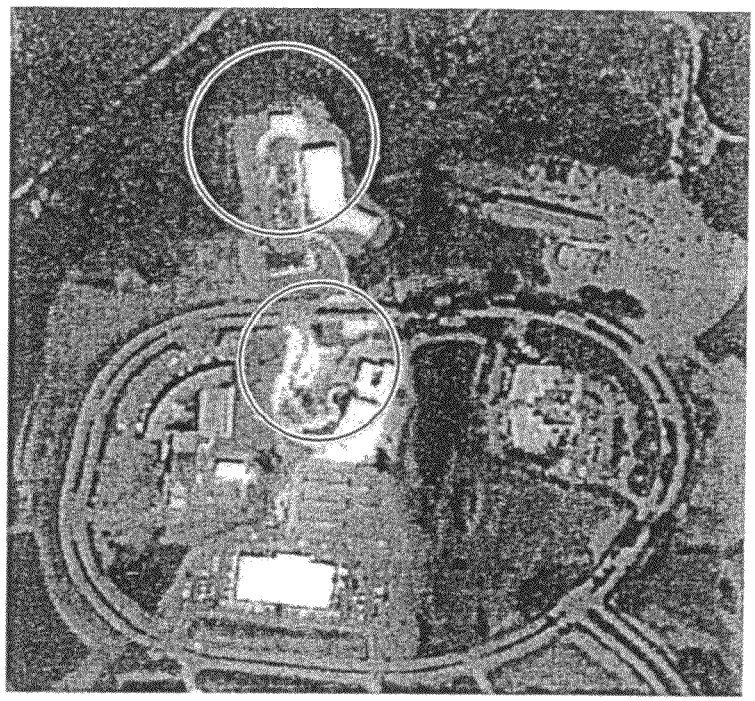
FIG. 19A shows an original image with change areas marked with a circle.
Figure 19B:
FIG. 19B shows a segmented binary image representing change (black pixels) and no change areas (white pixels)

In both embodiments, a reasonable threshold can be identified at the gray level location where the slope of the busyness measure changes (as shown in FIGS. 16A and 18A) and where a peak can be identified for the inverse difference moment plot at or beyond this gray level (as shown in FIGS. 16B and 18B). The threshold is shown as a dotted line in FIGS. 16A and 18A. FIG. 19A shows an original image with change areas marked with a circle and FIG. 19B shows the segmented binary image representing change (black pixels) and no change areas (white pixels). The accuracy of the binary image shown in FIG. 19B can be visually verified from images shown in FIGS. 13A and 13B.

The use of both the histograms allows the identification of almost similar threshold values. The presented methods provide threshold evaluation criteria in determining reasonable threshold values where manual trial-and-error procedures are not feasible or where a systematic implementation may be needed instead of the tedious manual procedures.

In the following paragraphs, a change detection model involving univariate image differencing, vegetation index differencing, and PCA is discussed. The aim is to combine the results obtained from these three different algorithms using a voting scheme. The results can be further refined by performing texture analysis.

A study site is selected. In this example, the study site is located at the Thad Cochran Research Park at Mississippi State University. In the interval of time between the two image collections, several buildings were erected, new roads built, and storm-water runoff facilities were emplaced.

Figure 20A:
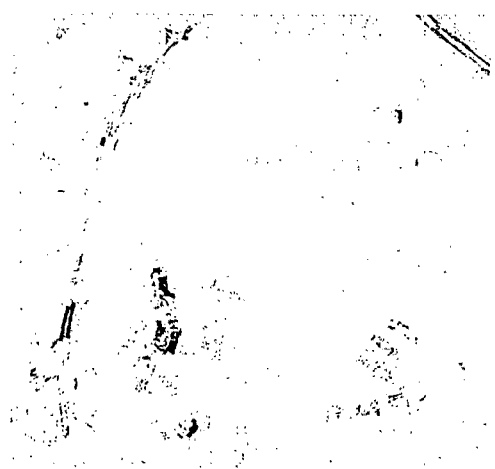
FIG. 20A is a binary image obtained from difference image of band 1 using a lower threshold of −50 and an upper threshold of 150.
Figure 20B:
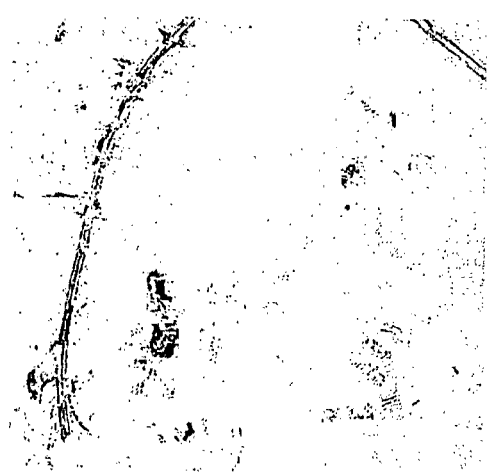
FIG. 20B is a binary image obtained from difference image of band 2 using a lower threshold of −100 and an upper threshold of 250.
Figure 20C:
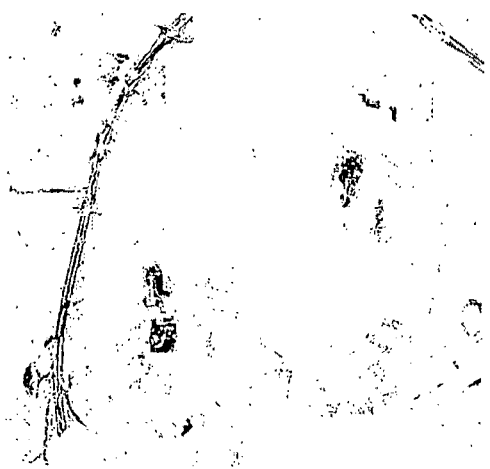
FIG. 20C is a binary image obtained from difference image of band 3 using a lower threshold of −150 and an upper threshold of 200.
Figure 20D:
FIG. 20D is a binary image obtained from difference image of band 4 using a lower threshold of −200 and an upper threshold of 300.

In an embodiment of the invention, Univariate image differencing is performed on all four spectral bands of the QuickBird data resulting in four difference images. The four difference images are segmented into change and no-change areas based on threshold values determined using previously discussed threshold evaluation criterion. In an embodiment of the invention, gray level versus local gray level matrix is used for the threshold determination. Four binary images representing change and no-change areas are obtained after thresholding. FIGS. 20A-D show the four binary images. FIG. 20A is a binary image obtained from difference image of band 1 using a lower threshold of −50 and an upper threshold of 150. FIG. 20B is a binary image obtained from difference image of band 2 using a lower threshold of −100 and an upper threshold of 250. FIG. 20C is a binary image obtained from difference image of band 3 using a lower threshold of −150 and an upper threshold of 200. FIG. 20D is a binary image obtained from difference image of band 4 using a lower threshold of −200 and an upper threshold of 300.

Figure 21A:
FIG. 21A shows a binary image obtained from vegetation index differencing and subsequent thresholding operation using a lower threshold of −0.2 and an upper threshold of 0.3.
Figure 21B:
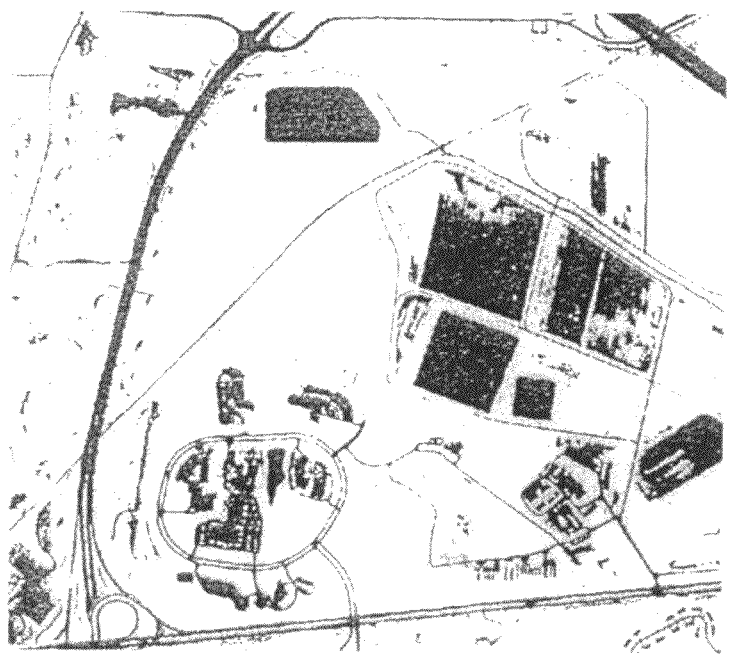
FIG. 21B shows a result on the binary image when a threshold value of 100 is used.

In an embodiment of the invention, vegetation index differencing was performed. Vegetation index differencing involves determining the difference in the normalized vegetation for the temporal images. The resultant difference image is thresholded using the threshold determination method discussed in the above paragraphs. FIG. 21A shows the binary image obtained from vegetation index differencing and subsequent thresholding operation using a lower threshold of −0.2 and an upper threshold of 0.3. For this experimental analysis, PCA is performed on the combined spectral bands of the two temporal images. The spectral bands from the two images are stacked on top of the other, and PCA is performed. The objective is to identify the impervious surfaces. The second PCA component is thresholded using an appropriate value to generate the binary image. For example, a threshold of 100 is used in the image shown in FIG. 21B.

Figure 22A:
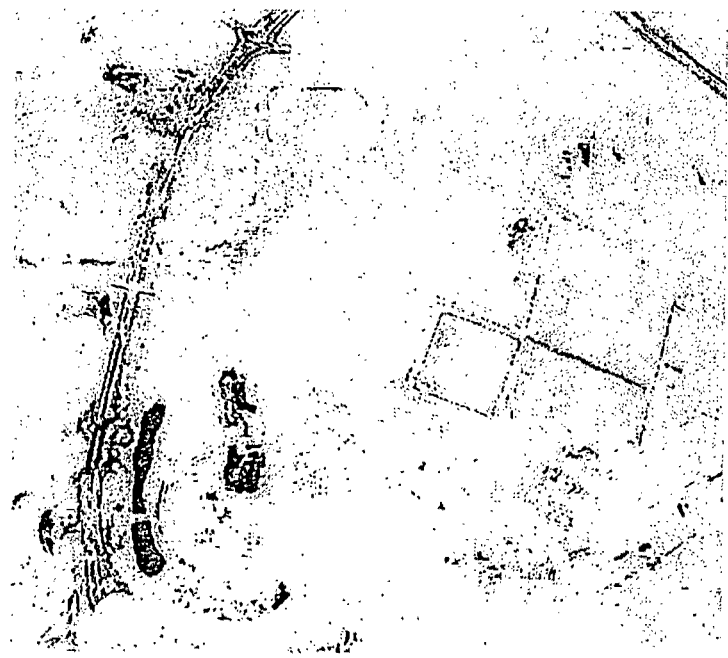
FIG. 22A shows an image resulting from combining individual change detection results using a voting scheme, according to an embodiment of the invention.

A total of six individual change detection results thus obtained are combined using a qualified voting scheme. Each of the change detection results cast different votes based on the weights assigned by the user. A pixel is identified as a change if it gets a vote above or equal to a pre-determined threshold value set by the user. The resultant binary change image is shown in FIG. 22A.

Figure 22B:
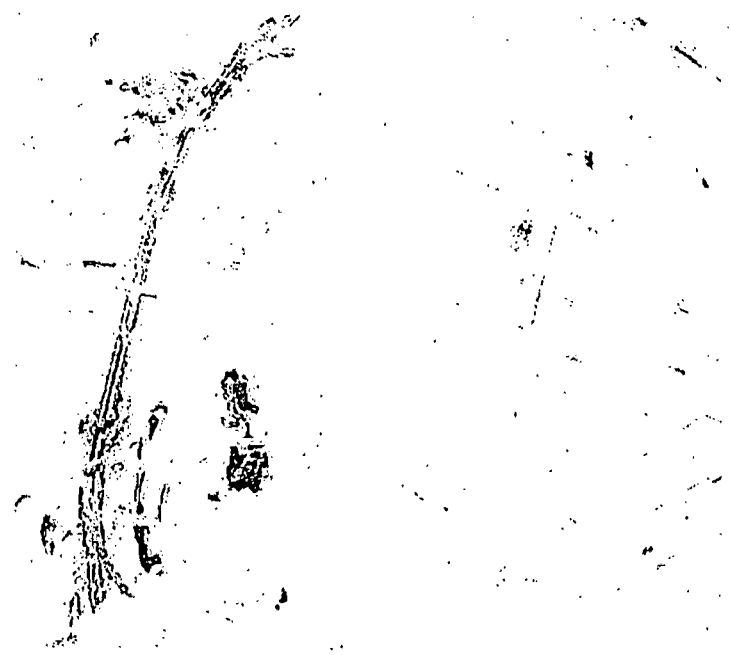
FIG. 22B shows a change detection result after performing texture analysis, according to an embodiment of the invention.

The resultant binary change image obtained from the combined change detection model is subjected to texture analysis to further refine the results. An 11-by-11 window is computed around each change pixel to compute the homogeneity feature. The difference in the homogeneity feature for the change pixels identified is used to refine the change detection result. The final change detection result after performing texture analysis is shown in FIG. 22B.

The usefulness of change detection strategy rather than relying on individual change analysis techniques is demonstrated herein. In addition, determination of appropriate thresholds to identify change and no-change area is also described. The methods described and quantified herein provide efficient, effective, and interactive identification of threshold values for computing change products that may be used to derive change analysis results.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the methods and systems of the present invention, like related systems and methods used in the imaging arts are complex in nature, are often best practiced by empirically determining the appropriate values of the operating parameters, or by conducting computer simulations to arrive at best design for a given application. Accordingly, all suitable modifications, combinations, and equivalents should be considered as falling within the spirit and scope of the invention.

In addition, it should be understood that the figures are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A method of estimating threshold values for change detection using remotely sensed data, the method comprising:
  using a computer-based device implementing the following steps:
    computing a probability distribution function of pixel intensity values in a difference image;
    plotting the probability distribution function as a histogram;
    generating a modified histogram of pixel intensity values by taking into account contextual spatial information of pixel intensity values;
    selecting a threshold value by observing the modified histogram for separating change areas from no change areas in the difference image; and
    generating textural features which may be used to reduce or eliminate pseudo change, wherein the textural features convey different texture information and are computed from a gray level co-occurrence matrix (GLCM) and comprise mean, variance, homogeneity, contrast, dissimilarity, entropy, energy, and correlation.

2. The method of claim 1, wherein computing the probability distribution function comprises computing the probability distribution for each pixel intensity value by dividing a number of pixels at each intensity value by the total number of pixels.

3. The method of claim 1, wherein the modified histogram of pixel intensity values is a gray level co-occurrence matrix defined as a matrix whose elements (i,j) represent a number of times a pixel with gray level j occurs in the difference image with a displacement relative to a pixel with gray level i.

4. The method of claim 3, wherein the gray level co-occurrence matrix is substantially symmetric about a main diagonal of the matrix, wherein elements of the matrix near a lower right corner and closer to the main diagonal correspond to pixels having high intensity and having similar pixels that do not substantially differ in their intensity values from their neighbor pixels.

5. The method of claim 4, wherein the elements of the matrix near the lower right corner correspond to change pixels.

6. The method of claim 1, wherein the modified histogram of pixel intensity values is a gray level versus local gray level histogram defined by elements (i,j) of the histogram wherein i represents the gray level of a pixel in the difference image and j represents the average gray level estimated around the pixel within a local neighborhood in the difference image.

7. The method of claim 6, wherein elements of the modified histogram closer to the upper left corner correspond to unchanged pixels and elements closer to the lower right corner correspond to change pixels.

8. The method of claim 6, wherein the local neighborhood around the pixel is a matrix of pixels in which a size of the matrix can be selected.

9. The method of claim 6, wherein selecting the threshold value comprises observing a gray level versus local gray level histogram.

10. A method of estimating threshold values for change detection using remotely sensed data, the method comprising:
  using a computer-based device implementing the following steps:
    computing a probability distribution function of pixel intensity values in a difference image;
    plotting the probability distribution function as a histogram;
    generating a co-occurrence matrix or a gray level versus local gray level matrix of pixel intensity values corresponding to the histogram by taking into account contextual spatial information of pixel intensity values;
    calculating a busyness measure for the co-occurrence matrix or the gray level versus local gray level matrix by making a double summation of all elements of the matrix;
    determining a threshold value by locating where a slope of the busyness measure changes; and
    generating textural features which may be used to reduce or eliminate pseudo change.

11. The method of claim 10, wherein the busyness measure is computed using the following formula, $$B_t = \sum_{i=t+1, j=t}^{L} M(i, j),$$

wherein M represents the co-occurrence matrix or the gray level versus local gray level matrix, t represents the threshold value, L represents the maximum gray level, and i represents the gray level of a pixel in the difference image and j represents the average gray level estimated around the pixel within a local neighborhood in the difference image.

12. A system for estimating threshold values for change detection using remotely sensed data, the system comprising:
  a computer-based device having:
    a memory in which a difference image is stored; and
    a processor configured to perform the steps of computing a probability distribution function of pixel intensity values in the difference image; and
  the computer-based device implementing the following steps:
    plotting the probability distribution function as a histogram;
    generating a modified histogram of pixel intensity values by taking into account contextual spatial information of pixel intensity values;
    selecting a threshold value by observing the modified histogram for separating change areas from no change areas in the difference image; and
    generating textural features which may be used to reduce or eliminate pseudo change, wherein the textural features convey different texture information and are computed from a gray level co-occurrence matrix (GLCM) and comprise mean, variance, homogeneity, contrast, dissimilarity, entropy, energy, and correlation.

13. A system for estimating threshold values for change detection using remotely sensed data, the system comprising:
- a computer-based device having:
- a memory in which a difference image is stored; and
- a processor configured to perform the steps of computing a probability distribution function of pixel intensity values in the difference image; and
- the computer-based device implementing the following steps:
  - plotting the probability distribution function as a histogram;
  - generating a co-occurrence matrix or a gray level versus local gray level matrix of pixel intensity values corresponding to the histogram by taking into account contextual spatial information of pixel intensity values;
  - calculating a busyness measure for the co-occurrence matrix or the gray level versus local gray level matrix by making a double summation of all elements of the matrix; and
  - determining a threshold value by locating where a slope of the busyness measure changes; and
  - generating textural features which may be used to reduce or eliminate pseudo change.

* * * * *